US009061830B2

(12) United States Patent
Miller et al.

(10) Patent No.: US 9,061,830 B2
(45) Date of Patent: Jun. 23, 2015

(54) METHOD AND SYSTEM FOR CONVEYING TIRES AND AN APPARATUS FOR DOING THE SAME

(71) Applicant: Multilift, Inc., Denver, CO (US)

(72) Inventors: Chris K. Miller, Denver, CO (US); Job Maldonado, Jr., Littleton, CO (US)

(73) Assignee: Multilift, Inc., Denver, CO (US)

( * ) Notice: Subject to any disclaimer, the term of this patent is extended or adjusted under 35 U.S.C. 154(b) by 0 days.

(21) Appl. No.: 14/154,141

(22) Filed: Jan. 13, 2014

(65) Prior Publication Data

US 2014/0197012 A1    Jul. 17, 2014

Related U.S. Application Data

(60) Provisional application No. 61/751,722, filed on Jan. 11, 2013.

(51) Int. Cl.
*B65G 15/44* (2006.01)
*B65G 17/46* (2006.01)
*B65G 23/22* (2006.01)
*B65G 1/04* (2006.01)
*B65G 15/24* (2006.01)
*B65G 41/00* (2006.01)

(52) U.S. Cl.
CPC .............. *B65G 17/46* (2013.01); *B65G 15/24* (2013.01); *B65G 15/44* (2013.01); *B65G 23/22* (2013.01); *B65G 41/002* (2013.01); *B65G 1/04* (2013.01); *B65G 2201/0273* (2013.01)

(58) Field of Classification Search
CPC .... B65G 17/42; B65G 15/42; B65G 2201/02; B65G 2812/02534; B65G 2812/02752
USPC ......... 198/801, 469.1, 621.4, 698, 699, 699.1
See application file for complete search history.

(56) References Cited

U.S. PATENT DOCUMENTS

| | | | |
|---|---|---|---|
| 2,809,743 A * | 10/1957 | Hinchcliffe ................... 198/699 |
| 2,987,169 A * | 6/1961 | Hinchcliffe ................... 198/699 |
| 3,100,566 A * | 8/1963 | Hinchcliffe ................... 198/699 |
| 3,822,526 A | 7/1974 | Black |
| 3,910,405 A | 10/1975 | Couperus et al. |
| 4,143,759 A * | 3/1979 | Paradis ...................... 198/690.2 |
| 4,534,461 A | 8/1985 | Silverthorn et al. |
| 4,700,078 A | 10/1987 | Mizuno et al. |
| 4,727,419 A | 2/1988 | Yamada et al. |
| 5,092,946 A | 3/1992 | Okuyama et al. |
| 5,194,107 A | 3/1993 | Okuyama et al. |
| 5,415,217 A | 5/1995 | Okuyama et al. |
| 5,697,294 A | 12/1997 | Keller et al. |
| 5,816,142 A | 10/1998 | Keller et al. |
| 6,527,499 B2 | 3/2003 | Leimbach et al. |
| 6,926,134 B2 | 8/2005 | Verdigets et al. |
| 7,249,496 B2 | 7/2007 | Kunitake et al. |
| 7,340,946 B2 | 3/2008 | Gotou et al. |
| 7,347,317 B2 | 3/2008 | Aizawa et al. |

(Continued)

*Primary Examiner* — James R Bidwell
(74) *Attorney, Agent, or Firm* — Sheridan Ross P.C.

(57) ABSTRACT

A conveyor for transporting and elevating articles and a method and system for conveying articles up inclines is provided. The conveyor has a conveyor belt and a plurality of support elements extending outward from the article-conveying surface of the conveyor belt advancing upward along the incline. The support elements prevent conveyed articles from sliding down the conveyor belt on the incline. The article-conveying surface of the conveyor belt may provide a low-friction retention surface to articles leaning away from the conveyor belt on the incline.

15 Claims, 13 Drawing Sheets

(56) References Cited

U.S. PATENT DOCUMENTS

| | | |
|---|---|---|
| 7,487,814 B2 | 2/2009 | Mizota |
| 7,543,698 B2 | 6/2009 | Haskell |
| 2007/0084275 A1 | 4/2007 | Gotou et al. |
| 2007/0135960 A1 | 6/2007 | Shibao et al. |
| 2007/0289847 A1 | 12/2007 | Nakamura |
| 2008/0053796 A1 | 3/2008 | DePaso et al. |
| 2009/0148260 A1 | 6/2009 | Leimbach et al. |
| 2010/0043952 A1 | 2/2010 | Terazono |
| 2011/0013177 A1 | 1/2011 | Crim |
| 2012/0092149 A1 | 4/2012 | Fujisawa |
| 2012/0325903 A1 | 12/2012 | Takahashi |

* cited by examiner

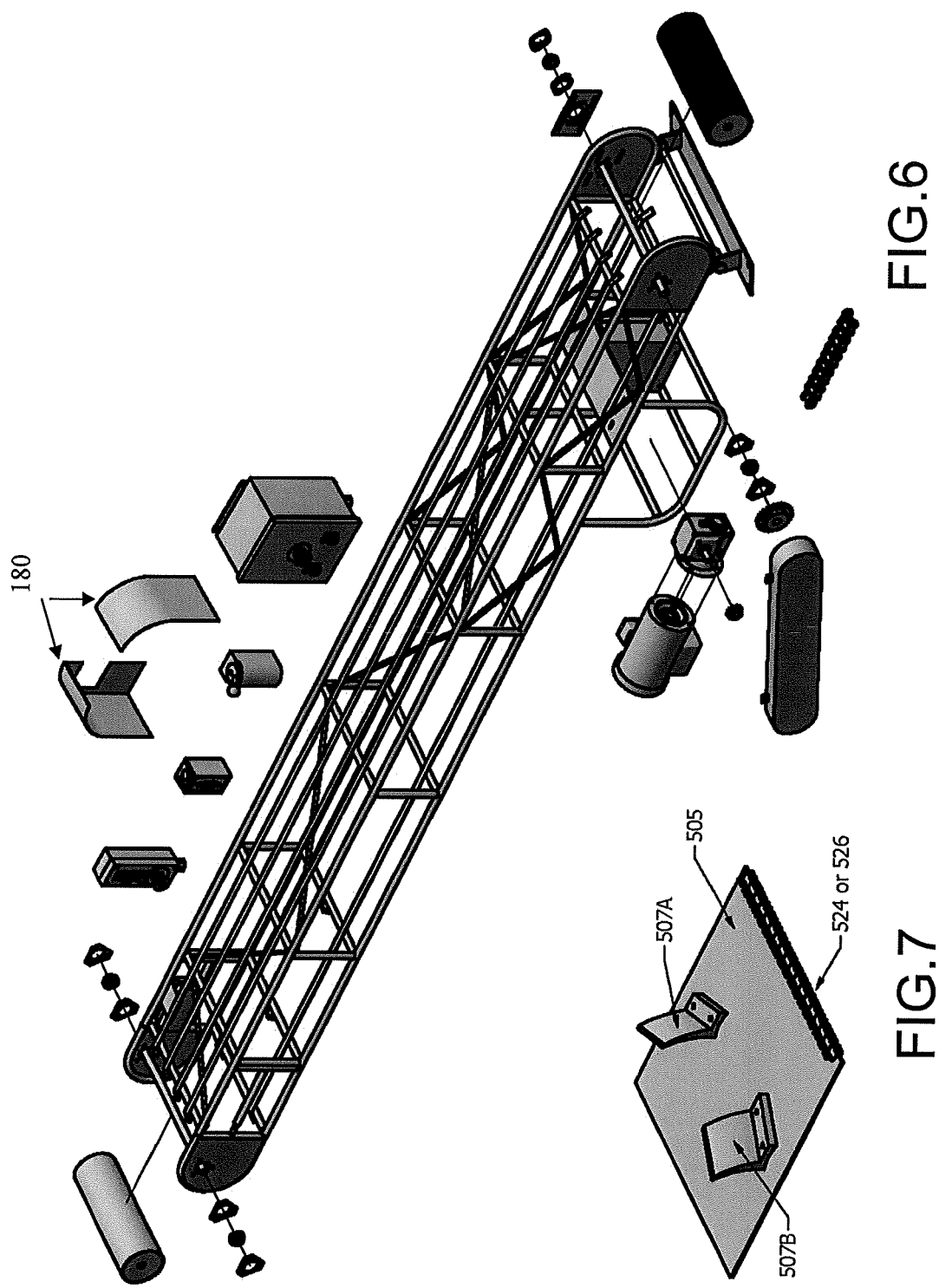

METHOD AND SYSTEM FOR CONVEYING TIRES AND AN APPARATUS FOR DOING THE SAME

CROSS-REFERENCE TO RELATED APPLICATIONS

This application claims priority to and the benefit of U.S. Provisional Patent Application Ser. No. 61/751,722, filed Jan. 11, 2013, the entire disclosure of which is incorporated by reference herein.

FIELD OF THE INVENTION

The invention relates generally to power-driven conveyors and, more particularly, to belt conveyors advancing on steep inclines to elevate articles, especially tires.

BACKGROUND OF THE INVENTION

In a tire manufacturing plant, tires molded in rows of tires presses are deposited on a trench conveyor and transported to an inspection, balance, or trim station. Because trench conveyors are typically positioned below the presses at a relatively low elevation, incline conveyors are used to elevate the tires received from the trench conveyor to the level of the presses or higher for transport to subsequent finishing stations. Belt conveyors, such as modular plastic belt conveyors with high-friction conveying-surface characteristics, work well on shallow inclines. On steeper inclines, however, belts with conveying surfaces textured with inverted cones or other non-skid protrusions work well when new. As the protrusions wear, tires begin to slide down the conveying surface as the belt advances up a steep incline. Rubber-topped belts are not so susceptible to wear, but the slippery mold-release material used to ease ejection of the tires from the presses coats the rubber conveying surface of the belt, which then loses its effectiveness as a high-friction surface. Consequently, incline angles are limited to a maximum of about 25° off horizontal. Such shallow inclines have a large footprint, taking up valuable floor space. Even if tires could be prevented from sliding along the conveying surface on steep inclines, there must be provisions to prevent tires from falling away from the belt. A wall or other static structure in sliding contact with high-friction articles, such as tires, being lifted on the incline may damage the articles and will increase the load, requiring an oversized belt and drive system.

In tire warehouses or stores and service stations stocking large numbers of tires, the tires are usually stacked to great heights. Further, the tires may be stacked on shelves or second levels and thus begin to be stacked at heights over 6 feet. Conveyors may be used to elevate the tires to the level of the tire storage or higher for transport to additional floors. Traditional conveyors use friction or protrusions to prevent the tires from sliding down the inclined conveyor or from falling off of the side of the conveyor belt. However, friction and protrusions are not fail-safe methods and tires often fall off of the conveyor causing harm to people and property located near the conveyor.

The tire distribution process often includes transporting large quantities of tires from the plants where they are manufactured to the various facilities where tires are delivered to consumers and/or mounted on vehicles. The processes for transporting tires from these plants to wholesalers, retailers, and service centers typically involve the use of large vessels. For example, semi-trailers are used for transportation over the road, rail cars are used for transportation via rail, and shipping containers are used for transportation over water. Further, these vessels often provide storage of tires prior to and after transport.

To minimize the costs associated with such storage and transportation, it is desirable to pack tires into each storage and/or transportation vessel in such a manner as to maximize the density of tires within the vessel, while providing satisfactory stability of the loaded tires and avoiding permanent deformation of the loaded tires. Maintenance of tires under a compressive load has been found to improve the stability of the loaded tires. However, compression may lead to permanent deformation of tires in some stacking configurations.

Additionally, to minimize the costs associated with storing the tires once they arrive at their destination (e.g., facilities where tires are delivered to consumers and/or mounted on vehicles such as warehouses and car repair shops), it is desirable to pack tires into the storage location in such a manner as to maximize the density of tires within the storage location, while providing satisfactory stability of the stored tires to prevent injury and save space and avoiding permanent deformation of the stored tires, which may be stored for months or even years.

When the storage and/or transportation within the vessel is complete, tires are typically manually unloaded from the vessel onto a conveyor or pallet. A variety of implements exist for such handling of tires. For example, U.S. Pat. No. 3,822,526, issued to Black in 1974 and incorporated herein in its entirety, discloses a device for manipulating tires. However, a device does not exist that sufficiently eliminates the difficulties of manually stacking tires in a storage and/or transportation vessel, and unloading the compressed tires from the same vessel. Moreover, no sufficient device currently exists to eliminate the reliance on the vessel to maintain a compressive load on tires. Although loaders for tires exist, for example, a machine loader and a loader to create a straight stack of tires, the existing loaders are not designed to stack tires in a herringbone pattern. Further still, the current practice is to rest tires directly against the wall and floor of the trailer or boxcar. As a result, the weight of the stacks is unevenly distributed causing further compression and strain on tires. Thus, a lower-compression system for cradling tires during storage and shipping is desired.

Belt conveyors for tires have been produced to transport tires up to various heights. See U.S. Pat. Pub. No. 2008/0053796 to DePaso et al. ("DePaso"). The entire disclosure of DePaso is incorporated by reference in its entirety.

Thus, there is a need for an elevating conveyor capable of transporting articles, especially tires and solar panels, up steep inclines. Additionally, there is a need for an elevating conveyor capable of transporting large tires, such as tractor trailer tires and tractor tires, and solar panels.

SUMMARY OF THE INVENTION

Certain embodiments of the present invention relate to a conveyor embodying features that address these needs.

Although many of the embodiments are focused on conveyors for tires, the invention may be used in any application where articles are conveyed to different locations. For example, some embodiments are directed to a conveyor for tires while other embodiments are directed to conveyors for solar panels, boxes, wheels, large spools, large rings, rubber components, etc. Further, some embodiments are directed to a conveyor for traditional car and/or SUV tires while other embodiments are directed to a conveyor for tractor trailer (i.e., eighteen-wheelers, semi trucks, semi trailers, or semis) tires, tractor tires, and/or farm machinery tires. Typically, the size and shape of the tire changes depending upon the use of the tire. For example, tires for small cars and/or light trucks may range from about 24" to about 32" in diameter. Tires for a large trucks and/or semi trailers may range from about 32" to about 48" in diameter. Tires for tractors or other farm machinery may range from about 32" to about 74" in diameter.

One aspect of the present invention is to provide a conveyor to move tires or articles up to different heights. The height and angle of the conveyor may be adjustable in some embodiments.

On a conventional tire inspection line, tires brought on a conveyor or like equipment may be stopped at a midway point where information may be read from the barcode affixed to the tires. This is done to identify the type and size of the tires being inspected and sort them into the tires to be sent to the next process and elsewhere. Therefore, one aspect of the present invention is to provide a tire sorting apparatus capable of reliably reading information from a tire identifier, such as a barcode, formed on the surface of a tire without damaging the tire.

It is also an aspect of the present invention to provide a conveyor system comprising a conveyor belt, support elements to support the articles being conveyed, a support frame for the belt and to raise the conveyor belt upward, and a power source. The conveyor belt may include sections secured together, one or more pieces of belt material, strengthening mechanisms either below or between the one or more pieces of belt material to support the support elements, an upper surface, and an under surface. The power source may comprise electrical components and a motor. Note that the terms "cleat" and "support element" can be used interchangeably herein.

In some embodiments, the conveyor may be specially designed to move passenger car and light truck tires upwardly at incline angles up to 60 degrees. In other embodiments, the conveyor may be specially designed to move semi truck and tractor tires upwardly at incline angles up to 60 degrees.

In various embodiments, the features of the conveyor include: a 18" wide 2 ply rubber covered top belt sliding flat at 58 FPM, one or more 4" high urethane cleats bolted to the belt on approximately 60" centers, a curved cleat pattern to fit tire contour, one up/stop/down switch at the bottom end, a 1 hp 115V 13 FLA electric motor with speed reducer mounted under bottom end, a thermal overload motor protector, a rubber lagged conveyor belt drive pulley, a plain idler pulley with belt tensioner, a high strength steel tubing truss conveyor frame, and a base plate. In additional embodiments, the conveyor may include: an off switch at the top end, a portable stand with casters to hold the top end at a fixed height, a portable stand with casters with a hand-winch adjustable top end height, up/emergency and stop/down switches at both ends of the conveyor with UL listing, a 24" wide belt for tractor trailer size tires, a 6" high single cleat for vertical tire lift installation, straight cleats for handling boxes, bags, and general merchandise, and a smooth or rough top belt for shallow inclines. In some embodiments, the width of the belt is larger than 24" and in other embodiments the width of the belt is less than 24".

Advantages of a conveyor of one embodiment of the present invention include: specially designed to move tractor trailer tires up the conveyor at incline angles up to 55 degrees, available 10 feet long and longer in 1 foot increments, 24" wide, 2 ply rubber covered top belt sliding flat at 58 FPM, 6" high urethane cleats bolted to the belt on approximately 60" centers, a curved cleat pattern to fit tire contour, one up/stop/down switch at the bottom end, a 1½ hp 115V 18 FLA electric motor with speed reducer mounted under bottom end, a thermal overload motor protector, all electrical prewired, a rubber lagged conveyor belt drive pulley, a plain idler pulley with belt tensioner, a high strength steel tubing truss conveyor frame, and a base plate. To select the conveyor size, take the floor-to-floor vertical distance and add the overhang desired, usually 2-3 feet. This sum equals the Total Vertical Distance (TVD). Use the table below as a guide for the conveyor length required. In some embodiments, the maximum recommended incline of operation is 60 degrees.

| Floor to Floor required Vertical Distance | | Recommended Overhang | | Total Vertical Distance (TVD) | Conveyor length at a 55 degree incline |
|---|---|---|---|---|---|
| 8 ft. | + | 2 ft. | = | 10 ft. high | 12 ft. long conveyor |
| 10 ft. | + | 2 ft. | = | 12 ft. high | 15 ft. long conveyor |
| 12 ft. | + | 2 ft. | = | 14 ft. high | 17 ft. long conveyor |
| 14 ft. | + | 2 ft. | = | 16 ft. high | 20 ft. long conveyor |

In various embodiments, the cleats may be attached, secured, or interconnected to the belt using a set of two bolts. Further, the bolts may be ¼"×1¼" #1 elevator bolts with hardware. The cleats may also include holes for the bolts or other interconnection mechanisms.

In some embodiments, the cleats may flip up when going up the conveyor and flip down when going down the back of the conveyor. In one embodiment, the cleats may be hinged to the belt such that they can flip up and down. Other flip mechanisms may also be contemplated by one skilled in the art. In some embodiments, the cleats are permanently attached to the belt. In other embodiments, the cleats are removable. In one embodiment, the cleats are attached without the use of screws.

In some embodiments, the cleats may be flexible. Thus, each cleat may be constructed entirely from an elastomeric material that provides flexibility. In one embodiment, the cleat or support element is flexible along the length of cleat such that when a tire or article is positioned on the conveyor belt, the two cleats bend in a direction opposite the direction of belt travel along the conveying path. In other embodiments they may be rigid.

In various embodiments, the cleats or tire support elements have a unique shape to hold tires on a conveyor belt. Thus, the first and second tire support elements each has a front section having an tire-supporting face that has a first curve that is curved along the tire support element's length and toward the direction of belt travel. The tire support element also has a back section with a second curve that is curved along its length and in the direction of belt travel. The second curve is typically greater than the first curve. Additionally, each of tire engaging support elements has a flat conveyor contacting surface that engages the outer tire-conveying surface of the conveyor belt. The support element may also have a top surface that is positioned at an angle relative to the flat conveyor contacting surface.

In various embodiments, the system may comprise one or more motors, which may be changed out to use motors having different power capabilities. In further embodiments, the motor(s) may be detachable and removable.

In some embodiments, the conveyor is foldable for storage flat on the ground or flat against a wall. In other embodiments, the conveyor may be foldable and stored in the location of use.

Therefore, when a user needs to use the conveyer, he or she just has to pull the conveyor down. The pull-down and storage motion may be similar to a Murphy bed in some embodiments. Further, the conveyor may be pulled down from a specific rack or other storage area.

In various embodiments, the conveyor may have rubber feet to help it stick to the ground/floor. The feet may be made of materials other that rubber in alternate embodiments. Thus, the bottom of the conveyor may contact the floor in one or more places depending on the embodiment. In other embodiments, the conveyor may be positioned on a rail such that the conveyor can slide along the rail to different storage areas. Thus, in an embodiment, the conveyor moves along the rails in a similar manner as library ladders. One skilled in the art can image a rail system similar to the rail systems described herein.

In various embodiments, the conveyor may include an endless conveyor belt looped around rotating drive elements, such as sprockets, drums, or pulleys, which advance the conveyor belt in a direction of belt travel along a conveying path. The endless conveyor belt may have an outer, article-conveying surface and an inner, drive surface engaged by the drive elements. On a steeply inclined elevating portion of the conveying path, the articles are conveyed vertically or at a steep angle. The articles are maintained in position and blocked from sliding down the outer surface of the conveyor belt on the steeply inclined portion of the conveying path by support elements or cleats that extend outwardly from the outer surface. The support elements are periodically spaced along the length of the conveyor belt to form individual bins for the articles. A steep incline for a given conveyor belt may be defined as a conveying path that is so steep that typical vibrations, jolts, or surges cause conveyed articles supported on support elements to fall from the conveyor belt advancing along the incline. In various embodiments, the conveyor may be inclined up to an angle of 60 degrees relative to the horizontal plane.

In some embodiments, once the articles are conveyed up the incline, they may be transferred to an outfeed conveyor for transport to downstream finishing stations or other storage sections. Further details of exemplary slide-preventing cleats or pair of cleats may extend outwardly from the outer, article-conveying surface of the conveyor belt. In an embodiment, the cleats may be integrally formed with the belts. In another embodiment, the cleats may be secured to a threaded insert in the belt by a bolt or the like through a bore formed in a block of the cleat.

In some embodiments, the cleats are secured to the conveyor belt. In other embodiments, the cleats are secured to a metal drive belt provided under the conveyor belt. Thus, the conveyor belt may have apertures in the belt such that the cleats can extend upwardly from the drive belt and above the conveyor belt. In alternative embodiments, the cleats are secured to a metal (or other material) support within the conveyor belt (i.e., between two layers of the conveyor belt). The cleats may be secured or interconnected to a belt or other part of the conveyor through the use of screws, pins, rivets, bolts, nails, glue, adhesive, sewing, clamps, bonding, welding, or any other mechanism now known or later conceived.

In various embodiments, the cleats are various sizes and shapes depending on the tire or article to be conveyed. In one embodiment, the conveyor belt may include support elements or cleats of many different sizes. The cleats may fold up in order to support an article to convey or may fold down such that it does not inhibit or interfere with the articles being conveyed. Thus, in this embodiment, the cleats that are of a size not currently being utilized are folded down such that they are substantially flat against or within the belt. In other embodiments, the cleats that are of a size not currently being utilized may be folded into the center of the conveyor belt such that they do not interfere with the articles being conveyed.

In various embodiments, the conveyor belt may be a modular plastic conveyor belt constructed of a series of individual belt modules made of a thermoplastic polymer, such as polypropylene, polyethylene, acetal, or a composite material, in an injection molding process. A threaded metallic insert may be inserted into the module during or after molding to serve as an attachment point for a support element. The details of one such insert and its use are described in U.S. Pat. No. 6,926,134, "Plastic Conveyor Belt Module with Embedded Fasteners," which is incorporated by reference herein in its entirety. Of course, other methods may be used to fasten the support elements to the conveyor belt.

In some embodiments, the conveyor belt sections comprising cleats may be interconnected to one another and to other similar belt sections without cleats in a side-by-side orientation and end-to-end by hinge rods through hinge eyes to form an endless conveyor belt.

In one embodiment, the system may comprise two cleats that are spaced apart laterally across the width of the conveyor belt. The cleats may have article-supporting faces defining planes oblique to the direction of belt travel and intersecting at a point on the belt below or behind the cleats on the steep incline. The two cleats provide two points of support for round articles, such as tires, and the space between them allows debris or fluids to drop from the tire and off of the belt.

In one embodiment, the belt is replaced with rollers or a roller array. The rollers provide a low-friction, rolling restraining surface that is especially useful with high-friction articles, such as tires. Further, the conveyor belt described as a plastic conveyor belt may be a flat belt or a flat-top chain in other embodiments. Another embodiment of an elevating belt conveyor embodying features of the present invention may include a roller array to prevent conveyed articles from falling off the belt.

One skilled in the art will appreciate that the conveyor and its features may vary depending upon the combination of elements in various embodiments. In some embodiments, the cleats have a rounded shape such that the curve of the cleat matches the curve of the tire being conveyed or transported. Thus, the curve of the cleat is slightly larger than the curve of the tire so that the tire will sit in and fit into the cleat. In still other embodiments, the cleat may have a different shape. For example, the cleat may not be curved. Rather, the cleat may be flat like a wall or tile. The cleat may also be shaped like a post or rod. Still further, the cleat may be V-shaped or U-shaped and only one cleat may be used to support each tire or conveyed article.

In some embodiments, the cleat may only come up to the midpoint of the side of the tire. In other embodiments the height of the cleat is greater than the height of the tire lying on its side, i.e., the width of the tire. In still further embodiments, the height of the cleat is somewhere between the midpoint of tire's side height and the top of the tire's side when the tire is lying on its side.

In various embodiments, one cleat per tire or conveyed article may be used. In other embodiments, two cleats per tire or conveyed article may be used. In other embodiments, 3 or more cleats per tire or conveyed article may be used. Additionally, in some embodiments one cleat may be used for one tire or conveyed article and two or more cleats may be used for another tire or article. Thus, the number of cleats could change throughout the conveyor.

In still more embodiments, the position of the cleats may be varied depending upon the shape and size of the tire or article conveyed. For example, the cleats may be spaced further apart and positioned at less of an angle relative to horizontal if the radius of the tire is large, whereas the cleats may be positioned closer together and at a greater angle relative to horizontal if the radius of the tire is small.

Although the invention has been described with application to tires, the invention also finds application to transporting other articles. For example, boxes, solar panels, windows, construction equipment, car or automobile components, tractor components, pallets of products, etc. may be transported on the conveyors.

In some embodiments, the conveyor may be configured with a conveyor belt, roller bars, and/or any other mechanism for moving tires. The conveyor may be configured to be located at any height above a platform to facilitate access by a worker. In one embodiment, the conveyor may be configured about three feet above the platform. The conveyor may be configured to automatically move tires in one or more directions. For example, in one embodiment, the conveyor may be configured to move tires from a placement station to any desired location, such as, for example, a tire loading system, a tire unloading system, a forklift, a railcar, and/or a tire rack. In another embodiment, the conveyor may be configured to move tires to/from a location such as, for example, a tire unloading system, a forklift, a railcar, a tire rack, a tire storage location or the like to/from the placement station for manual loading of tires into racks or storage areas in the tire load station.

In some embodiments of the conveyor system, humans may load articles or tires onto the conveyor (typically the bottom of the conveyor) and unload articles or tires off of the conveyor (typically the top of the conveyor) as a part of the system. In various embodiments, one or more persons load the tires and a different one or more persons unload the tires or articles. In alternate embodiments, machines or robots may load and unload the articles and tires. In additional embodiments a combination of humans, robots, and machines may be used to load and unload the articles or tires.

Lean manufacturing principles may be applied throughout embodiments of the invention to facilitate efficiency in tire loading, unloading, and/or storage. For example, in one embodiment, value stream mapping is used to analyze logistics data provided by a company to create Pareto analysis to identify high volume, high turn-over tire SKUs (i.e., stock control units). A manufacturing plant analysis is implemented to determine the capacity and production rate of a given customer to determine the size, capacity, number, and/or breadth of tire loading, unloading and/or storage needed to fulfill capacity and production goals. For example, for higher customer inventory levels, fully-automated loading, unloading and/or storage systems may be desired. However, for lower inventory levels, customers may use partially-automated loaders, unloaders, and/or storage systems to maximize efficiency and lower overall costs.

In yet other embodiments, the systems and methods of the present invention are facilitated by one or more human and/or computerized operators. For example, an operator monitors robot loaders and/or unloaders, monitors system settings and/or identifies racks that require replacement or repair. Operators also drive forklifts, load/unload tires, and/or the like to facilitate overall system usage.

One aspect of embodiments of the present invention is to provide a system capable of handling all sizes of vehicle tires, providing maximum compression of tires, and minimizing the manual labor required for loading, unloading, stacking, and/or storing the articles or tires.

In some embodiments of the system, tires are ricked or stacked in a herringbone pattern to facilitate compression and/or space management. The system and method also includes the stacking of tires in any other suitable arrangement that would allow the transport rack to perform similar functions. Moreover, the system and method may include any variation or angle of herringbone patterns that would allow the transport rack to perform similar functions as disclosed herein.

As one with ordinary skill in the art appreciates, the proper alignment of tires in the herringbone pattern depends upon the geometry of tires being stacked. Thus, the system contemplates and accommodates incorporation of an automated system for control of the loader system. The control system automatically senses tire geometry based on sensors located at an upstream position on the conveyor, or alternatively, accommodates the manual input of information. In both cases, however, the control system uses information that is indicative of tire geometry, such as outside diameter, inside diameter, and/or tread width, to determine the rotation and translation of each tire to produce the desired stacking pattern. With respect to herringbone stacking patterns, the relevant output variables may include the angle of deviation from vertical associated therewith the axis of rotation of tires in successive rows as well as the number of tires in each row and the number of rows in each stack. Furthermore, the control system may determine the appropriate amount of compression to apply to the stacked load, and the corresponding number of rows in the stack, to avoid permanent deformation of tires. The control system may consider a variety of factors in determining the appropriate compressive loads to apply. In one embodiment, these factors include the material properties and/or hardness of tires (usually rubber), tire geometry and stacked orientation, and the time and temperature environment to which compressed tires will be subjected. In addition, empirical data and experience may be incorporated to optimize the control of the system.

As used herein, warehouse racks include any type of rack that is distinct, including for example, pallets, racks such as those manufactured by Ohio Rack, Inc., or the like.

In some embodiments, the conveyor system may comprise one or more scanners to facilitate identifying each tire or article. For example, in one embodiment, the system comprises two scanners configured on both sides of a two-lane conveyor. The scanners may be configured both above and below the conveyor and/or articles to facilitate reading the articles' labels/SKUs. In alternate embodiments, the scanner may be a barcode scanner, a radio-frequency scanner, optical scanners, vision systems and/or any other type of scanner for reading and/or identifying tire or article labels and/or SKUs. The scanner may be configured with a CPU and/or any other computing system or unit. The scanner may also be configured to communicate with the rack loading system, conveyor, and/or any other part of the system or any other system described herein. Alternatively, RFID tags and readers may be used with the system.

In one embodiment, each tire on a conveyor and/or a warehouse storage area is the same type, size, and/or SKU number, or may be designated for the same destination or storage area. Tires may be delivered to storage areas and/or a warehouse rack on a conveyor. In additional or alternative embodiments, articles and tires may be delivered to storage areas and/or a warehouse rack on two or more conveyors. Further, the tire or article may be scanned and identified then loaded on to the appropriate conveyor for storage in the appropriate area.

Thus, one type of tire may be loaded onto one conveyor to be stored in a first area and a different type of tire or article may be loaded onto a second conveyor to be stored in a second area that is different from the first area.

In some embodiments, the conveyor system and the rack loading system may also be configured to stack tires or articles based upon identification information received from the scanner. For example, in one embodiment, the rack loading system may be configured to receive tire identification information from the scanner and to use the tire identification information to determine what tire stacking configuration to use. That is, for smaller diameter tires, the rack loading system may stack tires in layers of five tires, for example. For larger diameter tires, the rack loading system may stack tires in layers of four tires, for example.

In various embodiments, the one or more conveyors may elevate the tires to a stop position in front of one or more position pick-and-place loaders. The pick-and-place loaders may each comprise a support-mounted actuator system, each of which controls an extendable/retractable arm that is adapted to seize the tire or article from the conveyor.

In some embodiments, the system is configured to sort and queue tires horizontally. For example, the system comprises one or more tire transportation devices, such as, access conveyors that connect to one or more sub-conveyors. In an embodiment, an access conveyor may move the tires from the main unloading conveyor to various sub-conveyors. The sub-conveyors, in turn, may move tires to/from towers. Some conveyors may be configured to be computer-controlled devices to facilitate sorting, queuing and/or routing of the tires. In one embodiment, the tires are loaded randomly and scanners are used to sort, queue and/or route the tires when they are unloaded from towers.

In another embodiment, some conveyors may be configured with one or more scanners to obtain tire identifying information to facilitate sorting and queuing the tires. The scanners may be configured like scanners and communicate with the conveyors to facilitate directing each SKU of tire to a different sub-conveyor for loading into a particular tower. Each tower is configured to hold between 10 and 30 tires of a single SKU.

In one embodiment, a queuing system may comprise an inbound queue of tires or articles that have been unloaded from a trailer, railcar, forklift and/or other transportation mechanism. For example, a number of tires or articles are queued on each side of the queuing system.

In various embodiments, the system may also be configured with a control panel to facilitate worker operation of the conveyor. For example, the worker may use a panel to raise or lower the conveyor in order to facilitate access to tires, storage areas, and racks. In another embodiment, a load station may be configured with one or more scanners or cameras to detect the height of rack, storage floor, storage area, tires, and the conveyors and raise or lower the conveyor based on whether the height of the racks, tires, storage floor, storage area, or conveyor meets a predetermined height.

The scanner computing unit or any other computing unit used or described herein may be connected with each other via a data communication network. The network may be a public network and assumed to be insecure and open to eavesdroppers. In the illustrated implementation, the network is embodied as the Internet. In this context, the computers may or may not be connected to the Internet at all times. For example, the customer computer may employ a modem to occasionally connect to the Internet, whereas the bank computing center might maintain a permanent connection to the Internet. Specific information related to the protocols, standards, and application software utilized in connection with the Internet may not be discussed herein. For further information regarding such details, see, for example, Dilip Naik, "Internet Standards and Protocols" (1998); "Java 2 Complete," various authors (Sybex 1999); Deborah Ray and Eric Ray, "Hosting HTML 4.0" (1997); Loshin, "TCP/IP Clearly Explained" (1997). All of these texts are incorporated by reference herein in their entireties.

It may be appreciated that many applications of the present invention may be formulated. One skilled in the art may appreciate that a network may include any system for exchanging data or transacting business, such as the Internet, an intranet, an extranet, DSL, WAN, LAN, Ethernet, satellite communications, and/or the like. It is noted that the network may be implemented as other types of networks, such as an interactive television (ITV) network. The users may interact with the system via any input device such as a keyboard, mouse, kiosk, smart phone, e-reader, tablet, laptop, Ultrabook™, personal digital assistant, handheld computer (e.g., Palm Pilot®), cellular phone, or the like. Similarly, embodiments of the invention could be used in conjunction with any type of personal computer, network computer, workstation, minicomputer, mainframe, smart phone, etc. Moreover, although the invention is frequently described herein as being implemented with TCP/IP communications protocols, it may be readily understood that the invention may also be implemented using IPX, Appletalk, IP-6, NetBIOS, OSI or any number of existing or future protocols. Moreover, the present invention contemplates the use, sale or distribution of any goods, services or information over any network having similar functionality described herein.

In accordance with various embodiments of the invention, the Internet Information Server, Microsoft Transaction Server, and Microsoft SQL Server, may be used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Interbase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and/or the like.

A system user may interact with the system via any input device such as, a keypad, keyboard, mouse, kiosk, smart phone, e-reader, tablet, laptop, Ultrabook™, personal digital assistant, handheld computer (e.g., Palm Pilot®, Blackberry®, iPhone®, iPad®, Android®), cellular phone, or the like. Similarly, the invention could be used in conjunction with any type of personal computer, network computer, work station, minicomputer, mainframe, smart phone, tablet, or the like running any operating system such as any version of Windows, MacOS, iOS, OS/2, BeOS, Linux, UNIX, Solaris, MVS, tablet operating system, smart phone operating system, or the like, including any future operating system or similar system.

In one embodiment of the present invention, a tire sorting apparatus that includes a mounting means for mounting a tire in a plane perpendicular to the center axis of the tire, a tire grip means for gripping the inner periphery of the tire and positioning the center axis of the tire, an identifier reading means for reading a tire identification marking formed on the surface of the tire, and a holding means for holding the identifier reading means. The tire grip means may further include three grip arms arranged at the vertexes of a triangle within a plane perpendicular to the center axis of the tire and extending in a direction parallel to the center axis of the tire and an arm opening and closing mechanism for opening the three grip arms concentrically around the circle circumscribing the triangle. The holding means may further include a holding unit for holding the identifier reading means and a rotation drive unit for rotating the holding means around a rotating axis parallel to the center axis of the tire. And the center of the circumscribing circle is aligned with the rotating axis of the holding unit.

Some embodiments of the system of the present invention may further include a tire inside diameter detecting means for detecting a tire inside diameter from positional data or travel distance data of the three grip arms when the grip arms are gripping a tire. This allows not only acquisition of information from a tire identifier of a tire but also accurate measurement of the inside diameter of the tire. Hence, the possibility of rechecking the information on the tire identifier may further improve the accuracy of tire sorting.

Some embodiments of the system of the present invention may include a rotation radius changing means for changing the distance between the identifier reading means and the rotation axis of the holding unit and a detecting position control means for controlling the rotation radius changing means in such a manner as to move the identifier reading means to the position of the tire identifier based on the data of the tire inside diameter detected by the tire inside diameter detecting means. Thus, the rotation radius of the identifier reading means may be changed according to the tire size. Therefore, information may be read from the tire identifier even when there is a change in tire size.

Additional embodiments of the system of the present invention may provide a tire sorting apparatus that has a mounting means having a plurality of rotating bodies rotating in contact with the lower surface of the tire and a through hole through which the three grip arms may be extended toward the inner periphery of the tire.

In some embodiments of the system, devices to help in the compression of the tire stacks may be included. Some tire stacking systems, however, continue to rely heavily upon manual labor to accomplish the stacking of tires. For example, U.S. Pat. No. 5,697,294 issued to Keller et al. on Dec. 16, 1997, ("Keller I") discloses an exemplary tire compression device and U.S. Pat. No. 5,816,142 issued to Keller et al. on Oct. 6, 1998, ("Keller II") discloses another tire compression device intended for use with a forklift. Both Keller I and Keller II are incorporated by reference herein in their entireties. The Keller I and Keller II devices allow a preset load to compress a stack of tires as the stack is loaded into a truck trailer. Initially, the forklift elevates and supports the preset load. Then, once tires are stacked beneath the elevated load, the forklift allows the load to be lowered against a stack of tires. As a result, the load exerts a downward pressure on the stack of tires, thereby compressing the tires. Once the initial stack is compressed, additional uncompressed tires are loaded on top of the stack until the stack reaches the ceiling of the truck trailer. Then, the forks of the forklift are raised, partially releasing the pressure applied against the compressed portion of the stack and allowing it to expand, while compressing the previously uncompressed portion until the entire stack is equally compressed. This process is repeated, stack by stack, until the entire trailer is full of stacked, compressed tires. Other devices exist that load tires into a truck trailer and similarly compress tires within the trailer. In each of these cases, tires are maintained in compression by the storage and/or transportation vessel itself. However, no assurance exists that the vessel was designed or is suitable to maintain such loads. In fact, vessels are frequently damaged as a result of such use.

Various embodiments of the present invention include an apparatus for loading a tire onto a rack. The apparatus includes an automated tire conveyor, one or more scanners, and one or more robots to pick the tires off of the conveyor. The system may additionally include an apparatus for unloading a rack of tires, which includes a load station configured with a lift. The lift raises a rack of tires to a platform, where an unloader may manually or automatically move tires from the rack to a conveyor.

Further, some embodiments of the present invention include methods and systems for sorting and unloading tires into a store or warehouse for storage and sale as well. For example, the systems for sorting and unloading tires may include one or more automated conveyors, scanners, and storage structures. For example, in the sorting system, the scanner may read information off of incoming tires and communicate the tire information to a system of conveyors, which in turn directs each tire to a specific storage structure based upon the tire information (e.g., size, type, etc.).

In various embodiments, drive-in storage may also be included in the conveyor system configured with one or more computing systems, such as those described herein, to communicate with other loading or unloading systems of the system disclosed herein. For example, an unloading system within the system disclosed herein may communicate with drive-in storage when a first rack, which is being unloaded, is all or partially-empty such that a second rack may be delivered from the drive-in storage to the unloader. In another embodiment, an unloader or loader communicates with the drive-in storage when daily customer orders show that there is additional demand for a specific tire SKU (i.e., stock control unit). The rack may then be pulled from the drive-in-storage using, for example, a pull system applying lean manufacturing principles.

In some embodiments, the conveyor system may also include a system for loading, sorting, or unloading tires. The system may be automated or computer controlled. The system may be used in a plant that manufactures tires, and sorts and stores tires coming off the assembly line, and then dispenses tires in a desired order for shipment. Further, the system may also be used for loading and unloading articles or tires at a final destination, such as a tire shop or warehouse, where tires may be stored.

One aspect of the invention is a method for conveying articles up steep inclines. In one embodiment, the method for conveying articles up steep inclines comprises: (a) conveying articles on the conveying surface of an endless conveyor belt along a steep incline in a direction of belt travel; (b) blocking conveyed articles from sliding down the conveying surface of the conveyor belt on the steep incline; and (c) restraining conveyed articles leaning away from the conveying surface with a restraining surface moving in the direction of belt travel to prevent the leaning articles from falling away from the conveying surface of the conveyor belt on the steep incline.

The present invention includes a method of packing tires that includes placing one or more rows of tires against a bottom frame, adding an intermediate frame on top of the one or more rows of tires, compressing the tires, and attaching a vertical member to the intermediate frame. The method additionally includes adding one or more additional rows of tires on top of the intermediate frame, adding a top frame, compressing the one or more additional rows of tires, and attaching a vertical member to the top frame.

By way of providing additional background, context, and to further satisfy the written description requirements of 35 U.S.C. §112, the following references are incorporated by reference in their entireties for the express purpose of explaining the nature of conveyors and to further describe the various tools, pieces, and other apparatuses commonly associated therewith:

U.S. Pat. Pub. No. 2012/0325903 to Takahashi describes a tire sorting apparatus for reliably reading information from a tire identifier, such as a barcode, formed on the surface of a tire without damaging the tire. Placed under a tire-mounting table is a tire grip that has three grip arms arranged circularly in a plane perpendicular to the tire center axis and link mechanisms for spreading the grip arms. Placed above the mounting table is a barcode reader rotating means for rotating a barcode reader held by a barcode reader holder. The rotation axis of the barcode reader is aligned with the center of the circle formed by the grip arms of the tire grip.

U.S. Pat. Pub. No. 2009/0148260 to Leimbach et al., which is incorporated herein by reference in its entirety, discloses a tire loading apparatus and method of packing tires that includes placing the tires in a rack, compressing the tires, and assembling the rack. The apparatus includes one or more conveyors, scanners, and robots that load tires from a conveyor to a rack. A tire unloading apparatus is also disclosed. The unloading apparatus includes a scissor mechanism to rise and lower tire racks to an unloading platform. The unloading apparatus additionally includes one or more unloaders and conveyors. The sorting and unloading of tires is accomplished with one or more automated conveyors, scanners, and storage structures for reading information from incoming tires and using the tire information to sort and store the tires. A rack to improve compression and support of tires during storage and shipment is also disclosed.

U.S. Pat. No. 6,527,499, issued to Leimbach, et al. on Mar. 4, 2003, ("Leimbach") discloses an example of a tire loading system. The unloading system and method described herein may include features or steps (which may be in any order) described in Leimbach, which is incorporated by reference in its entirety.

U.S. Pat. Pub. No. 2010/0043952 to Terazono discloses a bead core and a bead filler and is incorporated by reference in its entirety.

U.S. Pat. Pub. No. 2012/0092149 to Fujisawa discloses an inspection apparatus arranged with a plurality of cameras located at relatively displaced circumferential positions and set for the respective shooting positions different from each other in the axial direction of the tire. Thus the images of the inner circumferential surface of the tire are shot by the plurality of cameras as the tire is rotated circumferentially relative to the plurality of cameras. Fujisawa is incorporated herein by reference in its entirety.

U.S. Pat. Pub. No. 2011/0013177 to Crim discloses an apparatus and method for verifying a laser etch on a rubber sample. In one embodiment, the apparatus includes a tire production line, a sample holding device, a laser having a diode, and a servo-assembly. The laser of the apparatus is configured to etch indicia on a sidewall of a tire on the tire production line and is further configured to etch at least one line in a rubber sample on the sample holding device. Crim is incorporated herein by reference in its entirety.

U.S. Pat. No. 7,249,496, issued to Kunitake, et al. on Jul. 31, 2007, ("Kunitake") discloses an uniformity inspection line with a decision-only line having first UF machines exclusive for the measurement of the uniformity of a tire sorted and distributed on an automatic sorting line and a correction-only line having second UF machines for the correction and re-measurement of the uniformity characteristics of a tire having uniformity characteristics outside specific values measured on the above decision-only line. Kunitake is incorporated herein by reference in its entirety.

U.S. Pat. No. 7,340,946, issued to Gotou, et al. on Mar. 11, 2008, and U.S. Pat. Pub. No. 2007/0084275 to Gotou, et al. disclose a method and a device for inspecting a tire, the method comprising the steps of, in a rim assembly station separated from an inspection station having a tire inspector installed thereon, forming a rim/tire assembly in a setup by assembling one side and the other side rims and with an inspected tire and, when an inspection is performed, transforming the rim/tire assembly from the rim assembly station to the tire inspector on the inspection station, whereby a preparatory operation time in the tire inspector can be shortened to shorten a cycle time. The Gotou patent and Gotou publication are incorporated herein by reference in their entireties.

U.S. Pat. No. 7,487,814, issued to Mizota, et al. on Feb. 10, 2009, discloses an object to provide a tire reinforcing layer forming device which can form, by a single device, plural reinforcing layers whose cord directions intersect one another. A reinforcing material piece, which is distributed to an upper conveying path, is affixed from a left end side of a drum toward a right side, while the drum is rotated in a direction of arrow CW. Mizota is incorporated herein by reference in its entirety.

U.S. Pat. No. 7,347,317, issued to Aizawa, et al. on Mar. 25, 2008, discloses methods and devices for measuring elongation, wear, and internal temperature of a conveyor belt to catch signs of conveyor belt failure such as breakage by detecting a magnetic field from a magnetic body by using a magnesium sensor, as well as a rubber magnet sheet as a magnetic body and a method of producing the sheet, the rubber magnet sheet being able to be used while it is embedded in the conveyor belt. Aizawa is incorporated herein by reference in its entirety.

U.S. Pat. No. 7,543,698, issued to Haskell, et al. on Jun. 9, 2009, and discloses an article elevator for moving lightweight open ended containers from a first level to a second level vertically spaced from the first level and is incorporated herein by reference in its entirety. The article elevator includes an input section at the first level for receiving container bodies. An elevator section is positioned for receiving container bodies from the input section. A discharge section is located at the second level for receiving container bodies from the elevator section. A plurality of arms is movably mounted above the input section, the elevator section, and the discharge section. Each of the arms moves a group of container bodies from the input section over the elevator section to the discharge section so that successive groups of container bodies are moved to the discharge section from the input section.

U.S. Pat. No. 3,910,405, issued to Couperus, et al. on Oct. 7, 1975, and discloses a belt elevator for elevating loose bulk material from one level to another. The belt elevator comprises a pair of cooperating endless belt conveyors whose forward runs are juxtaposed to face one another with an edge of one in sealing engagement with the other, the material being retained therebetween. A first belt conveyor is provided with raised edges which engage and seal with the edges of the other. The first conveyor is also provided with generally evenly spaced transversely positioned cleats or raised portions which, together with the raised edges, forms pockets to contain material being elevated. The stiffness of the first belt conveyor is greater than that of the second belt conveyor. The second belt conveyor is troughed at the entry portion for receiving the material to be elevated which material is discharged from the first belt conveyor at a discharge point at the higher level. The belts are maintained in tension to insure edge engagement and the retention of material therebetween. Couperus is incorporated herein by reference in its entirety.

U.S. Pat. Pub. No. 2007/0135960, to Shibao et al., discloses a production evaluation managing system in a factory including facilities in a plurality of production processes from materials to products and a means for evaluating the products based on at least one of inspection and testing characterized by comprising a network connecting the facilities in respective production processes with the evaluating means, and a means for collecting through the network field data of the facility in a production process pertaining to the production of a product corresponding to the information of evaluation results, based on the information of evaluation results of the products outputted from the evaluating means. By this, when a nonconformity is found from the information of evaluation results based on at least one of inspection and testing of the product, field data of the facility in a production process pertaining to production of a product corresponding to the information of evaluation results can be collected and analyzed immediately and the problem with the production process can be investigated immediately in a short time. Shibao is incorporated herein by reference in its entirety.

U.S. Pat. Pub. No. 2007/0289847 to Nakamura is incorporated herein by reference in its entirety and discloses a rubber member conveying device and a rubber member supplying system. The device and the system rapidly promote the shrinkage of the rubber member, thereby avoiding the length variation of the rubber member in the processing step for the rubber member. A rubber member supplying system comprises a belt conveyor which supplies a to-be-cut material having an internal strain, a cutter which cuts the to-be-cut material supplied by the belt conveyor to form a rubber member, and a rubber member conveying part which conveys the rubber members. The rubber member conveying part comprises an endless belt, and rollers supported by supporting parts that are provided at the endless belt. The rubber member is conveyed on the rollers while exposed to vibrations. Accordingly, the shrinkage in the rubber member caused by the internal strain thereof is substantially completed in the conveying operation.

U.S. Pat. No. 4,534,461, issued to Silverthorn, et al. on Aug. 13, 1985, and discloses a conveyor construction for conveying materials, such as grain, to an elevated location. The conveyor construction comprises a base or supporting structure and an auger conveyor is mounted horizontally on the base. Grain is fed into a hopper at one end of the auger and the discharge end of the auger is provided with a pair of kicker paddles which propel the grain laterally into the lower end of a vertical endless belt conveyor. The endless belt conveyor includes a plurality of integrally molded cleats that convey the grain upwardly within a vertical passage in the conveyor housing and the grain is discharged from the upper end of the housing. The vertical conveyor is mounted for pivoting movement relative to the auger conveyor to adjust the angularity of the vertical conveyor. Silverthorn is incorporated herein by reference in its entirety.

U.S. Pat. No. 4,727,419, issued to Yamada, et al. on Feb. 23, 1988, and is incorporated herein by reference in its entirety. Yamada discloses a system in case of detecting tire information marks engraved in a side wall portion of tire in the form of protrusion or recess, width and inner diameter of tire are detected to provide a tire size signal, after a first camera head is driven into a given position in accordance with the tire side signal, an identification mark engraved in the size wall portion of tire is optically detected by the first camera head to derive a position signal, and after a second camera head is driven into a given position in accordance with the position signal, the tire information marks are optically detected by the second camera head to derive a tire information signal. In this manner, the tire information marks can be detected in a rapid and accurate manner.

U.S. Pat. No. 4,700,078, issued to Mizuno, et al. on Oct. 13, 1987, and discloses a method and system for detecting tire information marks. Tire information marks for denoting tire kind, tire size, etc. formed in a surface of side wall of a tire as a protrusion or groove having a triangular cross section are optically detected by illuminating the surface of side wall of the tire from a first direction substantially perpendicular to the surface of the side wall of the tire and a second direction inclined with respect to the surface of the side wall of the tire, and picking up an image of the surface of the side wall of the tire thus illuminated from the two different directions to derive an image signal. The image signal thus derived is converted into a bivalent signal, and is thinned to produce a mark pattern. Then the mark pattern is compared with a thick standard mark pattern. When a substantial part of the detected mark pattern is included in the standard mark pattern, the detected mark pattern is recognized to be identical with the standard mark pattern. Mizuno is incorporated herein by reference in its entirety.

U.S. Pat. No. 5,092,946, issued to Okuyama, et al. on Mar. 3, 1992, U.S. Pat. No. 5,415,217, issued to Okuyama, et al. on May 16, 1995, and U.S. Pat. No. 5,194,107, issued to Okuyama, et al. on Mar. 16, 1993. The Okuyama patents disclose a method and an apparatus for sticking a belt-like member, wherein a belt-like member prepared by cutting a raw material of the belt-like member on a conveyor at two front and rear locations, is conveyed by the conveyor, wrapped around a cylindrical drum and stuck to the drum. The inclination angle of the cut line at the leading end of the belt-like member is measured at the time of cutting, the inclination angle of the cut line at the trailing end is measured at the time of cutting, and by comparing the inclination of the cut line at the trailing end with the inclination angle at the leading end, an amount of connection for the inclination angle is calculated. The three Okuyama patents are incorporated by reference herein in their entireties.

In one embodiment, the conveyor comprises an endless conveyor belt having an outer article-conveying surface. The conveyor belt advances in a direction of belt travel along a conveying path that includes a steeply inclined portion. The conveying belt also includes support elements that extend outward from the outer article-conveying surface of the conveyor belt at periodically spaced positions and retention means are disposed along the steeply inclined portion proximate the support elements prevent conveyed articles from falling away from the conveyor belt on the steeply inclined portion.

In various embodiments, the conveyor system comprises an endless conveyor belt having an outer article-conveying surface. The conveyor belt advances in a direction of belt travel along a conveying path that includes a steeply inclined portion. The conveying belt further includes support elements that extend outward from the outer article-conveying surface of the conveyor belt. An article-restraining surface facing the article-conveying surface of the conveyor belt is positioned outward of the support elements across gaps along the steeply inclined portion of the conveying path. The article-restraining surface engages outwardly leaning conveyed articles moving upward on the steeply inclined portion of the conveying path in low-friction contact. The article-restraining surface may be the outer surface of a belt advancing in the direction of belt travel or the outer surfaces of an array of rollers rotating in the direction of belt travel on contact with outwardly leaning conveyed articles.

In one embodiment, the conveyor for conveying articles up inclines comprises: an endless conveyor belt having an outer article-conveying surface and advancing in a direction of belt travel along a conveying path including an inclined portion; a plurality of support elements extending outwardly from the outer article-conveying surface of the conveyor belt and spaced apart at an increment approximately equal to about 1.5 times a length of the article conveyed, where the plurality of support elements comprises pairs of two support elements and each support element in the pair is positioned proximate to the other support element in the pair and with a space between the two support elements, where each support element comprises: curved section having an article-supporting face, which is curved at a first radius of curvature and is positioned in the direction of belt travel, and a back side opposite the article-supporting face, the back side is curved with a second radius of curvature, where the first radius of curvature is smaller than the second radius of curvature; a block-like bottom section with a flat bottom that engages the outer article-conveying surface of the conveyor belt; and a top opposite the bottom, where the top is positioned at an angle relative to the flat bottom; two securing mechanisms for each support element to secure the support elements on the conveyor belt; a support frame with a support stand positioned proximate to a floor surface and support bars; a drive pulley interconnected to the support frame and positioned at the bottom of the support frame, where an underside of the conveyor belt engages an outer surface of the drive pulley; a tail pulley interconnected to the support frame and positioned at the top of the support frame, where an underside of the conveyor belt engages an outer surface of the tail pulley; and a motor for moving the conveyor belt around the drive pulley and tail pulley.

In a further embodiment, a first support element in one pair of support elements has an article-supporting face defining a first plane oblique to the direction of belt travel and a second support element in the pair of support elements has an article-supporting face defining a second plane oblique to the direction of belt travel. The first plane and the second plane intersect at a point on the conveyor belt below the first support element and the second support element. In another embodiment, the support elements are contoured in shape to mate with the conveyed article. In one embodiment, the support elements are made of an elastomeric material that conforms to the shape of a conveyed article on the inclined portion of the conveying path. In additional embodiments, the conveyor further comprising a retention mechanism for preventing the conveyed articles from falling off of the conveyor belt, said retention mechanism positioned along the inclined portion of the conveying path. The conveyor may alternatively comprise an article-restraining surface positioned above and facing the article-conveying surface of the conveyor belt, where the article-restraining surface is spaced away from the support elements, and where the article-restraining surface engages outwardly leaning conveyed articles moving upward on the inclined portion of the conveying path in low-friction contact. In one embodiment, the inclined portion of the conveying path is approximately 60 degrees as measured from a horizontal plane.

One embodiment of a tire conveyor for conveying tires up an incline comprises: an endless conveyor belt having a lateral extent and a longitudinal extent, and an outer tire-conveying surface that is designed to advance in a direction of belt travel along a conveying path including an inclined portion; a first pair of first and second tire support elements, with each of said first and second tire support element having a same width (w), length (l) and height (h), with said first tire support element spaced a distance along said lateral extent of said conveyor belt from said second tire support element by at least twice the width, where said pair of first and second tire support elements are each interconnected to said outer tire-conveying surface by two independent fasteners that penetrate through said outer tire-conveying surface, said first tire support element being fastened to said outer tire-conveying surface at a first angle with respect to said lateral extent of said conveyor belt, and said second tire support element being fastened to said outer tire-conveying surface at a second angle with respect to said lateral extent of said conveyor belt, said first angle and said second angle being commensurate and opposite each other, where when a tire is placed in contact with said first and second tire support elements, the first tire support element is between a 4 o'clock and 5 o'clock position of the tire and the second tire support element is between a 7 o'clock and 8 o'clock position of the tire, where each of said first and second tire support elements has a front section having an tire-supporting face that has a first curve that is curved along its length and toward the direction of belt travel and a back section that has a second curve that is curved along its length and in the direction of belt travel, said second curve being greater than said first curve, each of said pair of tire engaging support elements having a flat conveyor contacting surface that engages the outer tire-conveying surface of the conveyor belt, each of said tire support elements constructed entirely from an elastomeric material that provides flexibility along said length of said tire support elements such that when a tire is positioned on said conveyor belt, said first and second tire support elements bend in a direction opposite the direction of belt travel along a conveying path; a second pair of first and second tire support elements spaced apart from said first pair of tire support elements by at least a distance of 1.5 times a length of a tire conveyed on said conveyor belt; a support frame with a support stand, said support frame having two, longitudinally extending side bar supports extending parallel to each other and connected to each other by a plurality of support struts; a drive pulley operably connected to said support frame that engages said conveyor belt; a tail pulley operably connected to said support frame that engages said conveyor belt; and a motor operably connected to said drive pulley.

The tire conveyor may further comprise a tire-restraining mechanism interconnected to the support frame and positioned above and facing the tire-conveying surface of the conveyor belt, where the tire-restraining mechanism comprises at least one bar arranged in the direction of belt travel and at least two bars positioned perpendicular to the direction of belt travel, where the tire-restraining surface is spaced away from the support elements, and where the tire-restraining surface engages outwardly leaning conveyed tires moving upward on the inclined portion of the conveying path. In some embodiments, the tire conveyor comprises an array of rollers having outer surfaces forming the tire-restraining surface facing the tire-conveying surface, where the rollers are arranged to rotate in the direction of belt travel on contact with outwardly leaning conveyed tires. In additional embodiments, the tire conveyor further comprises a tire sorting apparatus comprising: a mount, where the mount positions a tire in a plane perpendicular to the center axis of the tire; a tire grip, where the tire grip grips the inner periphery of the tire and positions the center axis of the tire; an ID reader, where the ID reader reads a tire identification marking formed on the surface of the tire; and a holder, where the holder holds the ID reader, where the tire grip further includes three grip arms arranged at the vertexes of a triangle within a plane perpendicular to the center axis of the tire, where the holder further includes a holding unit for holding the ID reader, and a rotation drive unit for rotating the holder around a rotation axis parallel to the center axis of the tire, and where the center of the circumscribing circle is aligned with the rotation axis of the holding unit. Still further, the conveyor may comprise an apparatus for loading the tire onto a rack, the apparatus comprising: a first scanner configured to provide information regarding said tire; a tire conveyor configured to transport said tire; a robot configured to automatically move the tire from the tire conveyor onto the rack; and a computer configured to control the robot using the information from the first scanner.

One embodiment of a method for conveying articles up steep inclines is provided, the method comprising: providing a conveyor for conveying articles up an incline, said conveyor comprising: an endless conveyor belt having a lateral extent and a longitudinal extent, and an outer article-conveying surface that is designed to advance in a direction of belt travel along a conveying path including an inclined portion; a plurality of support elements, with each support element having a same width (w), length (l), and height (h), where each support element of said plurality of support elements is interconnected to said outer conveying surface by two independent fasteners that penetrate through said outer article-conveying surface, where each of said support elements has a front section having an article-supporting face that oriented in the direction of belt travel, each of said support elements having a flat conveyor contacting surface that engages the outer article-conveying surface of the conveyor belt, each of said support elements constructed of urethane material that provides strength along the supporting elements such that when a conveyed article is positioned on said conveyor belt, said first and second supporting elements, where a second support element in the plurality of support elements is spaced apart from a first support element in the plurality of support elements by at least a distance of 1.5 times a length of an article conveyed on said conveyor belt; a support frame with a support stand, said support frame having two, longitudinally extending side bar supports extending parallel to each other and connected to each other by a plurality of support struts; a drive pulley operably connected to said support frame that engages said conveyor belt; a tail pulley operably connected to said support frame that engages said conveyor belt; and a motor operably connected to said drive pulley; moving said endless conveyor belt in the direction of belt travel using the motor, the drive pulley, and the tail pulley; conveying articles on the outer article-conveying surface of the conveyor belt; advancing the conveyed articles in the direction of belt travel along a conveying path including the inclined portion; blocking conveyed articles from sliding down the conveying surface of the conveyor belt on the inclined portion by using said plurality of support elements; and removing the conveyed articles from the conveyor belt.

The method may, in some embodiments, further comprise sorting the conveyed articles using a sorting apparatus; and depending on the sorting step, loading a first type of conveyed article onto the conveyor belt. Additionally, the method comprises a method of unloading conveyed articles from a rack, the method comprising: moving the conveyed articles from the rack to the sorting apparatus; reading identification information on the conveyed articles using a computer-controlled vision system; removing the conveyed articles from the conveyor belt using a robot, where the identification information facilitates control of the second robot; and placing the conveyed articles in one of a loader and a storage structure.

While various configurations of the conveyor are herein specified, this description is only exemplary and is not intended to limit or otherwise narrow the invention. The conveyor may include any number of components in any potential combination thereof as desired for achieving the desired function for desired article shape and size and incline.

One or ordinary skill in the art will appreciate that embodiments of the present invention may be constructed of materials known to provide, or predictably manufactured to provide the various aspects of the present invention. For example, materials used in the support structure of the conveyor may include, for example, metal, composites, plastics, and other synthetic and natural materials. Further, the belt of the conveyor may be comprised of rubber, latex, synthetic rubber, synthetic materials, polymers, and natural materials.

As used herein, the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The phrases "device", "apparatus", "conveyor", "conveyor apparatus", and "conveyor device" are used herein to indicate the invention device.

The phrase "removably attached", "removable", and/or "detachable" is used herein to indicate an attachment or connection of any sort that is readily releasable or disconnected.

This Summary of the Invention is neither intended nor should it be construed as being representative of the full extent and scope of the present invention. The present invention is set forth in various levels of detail in the Summary of the Invention as well as in the attached drawings and the Detailed Description, and no limitation as to the scope of the present invention is intended by either the inclusion or non-inclusion of elements, components, etc. in this Summary of the Invention. Additional aspects of the present invention will become more readily apparent from the Detailed Description, particularly when taken together with the drawings.

The above-described benefits, embodiments, and/or characterizations are not necessarily complete or exhaustive, and in particular, as to the patentable subject matter disclosed herein. Other benefits, embodiments, and/or characterizations of the present disclosure are possible utilizing, alone or in combination, as set forth above and/or described in the accompanying figures and/or in the description herein below. However, the Detailed Description, the drawing figures, and the claims set forth herein, taken in conjunction with this Summary of the Invention, define the invention.

BRIEF DESCRIPTION OF THE DRAWINGS

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein.

The accompanying drawings, which are incorporated in and constitute a part of the specification, illustrate embodiments of the invention and together with the general description of the disclosure given above and the Detailed Description of the drawings given below, serve to explain the principles of the disclosures.

FIG. 6 is an exploded view of the embodiment of the conveyor shown in FIG. 3;

FIG. 7 is a perspective view of a section of a belt with cleats;

It should be understood that the drawings are not necessarily to scale, and various dimensions may be altered. In certain instances, details that are not necessary for an understanding of the invention or that render other details difficult to perceive may have been omitted. It should be understood, of course, that the invention is not necessarily limited to the particular embodiments illustrated herein.

DETAILED DESCRIPTION

The invention described herein relates to a conveyor used in any application where an article (such as a tire) may need to be transported or lifted more than five feet. Such applications include moving tires and articles during manufacture, after manufacture to be shipped, loading tires and articles on the shipping vessels, unloading the tires and articles off of the shipping vessels, and moving the tires and articles within stores and warehouses to their final storage place.

It should be appreciated that the particular implementations and embodiments shown and described herein are illustrative of the invention and are not intended to otherwise limit the scope of the present invention in any way. Indeed, for the sake of brevity, trivial and conventional features and aspects of the present invention are not described in extensive detail herein. It should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. Furthermore, the connecting lines shown in the various figures shown herein are intended to represent exemplary functional relationships and/or physical couplings between the various elements of the system. It should be noted that many alternative or additional functional relationships or physical connections may be present in a practical conveyor apparatus, conveying system, conveying method, tire sorting system, and tire loading system.

Figure 1:
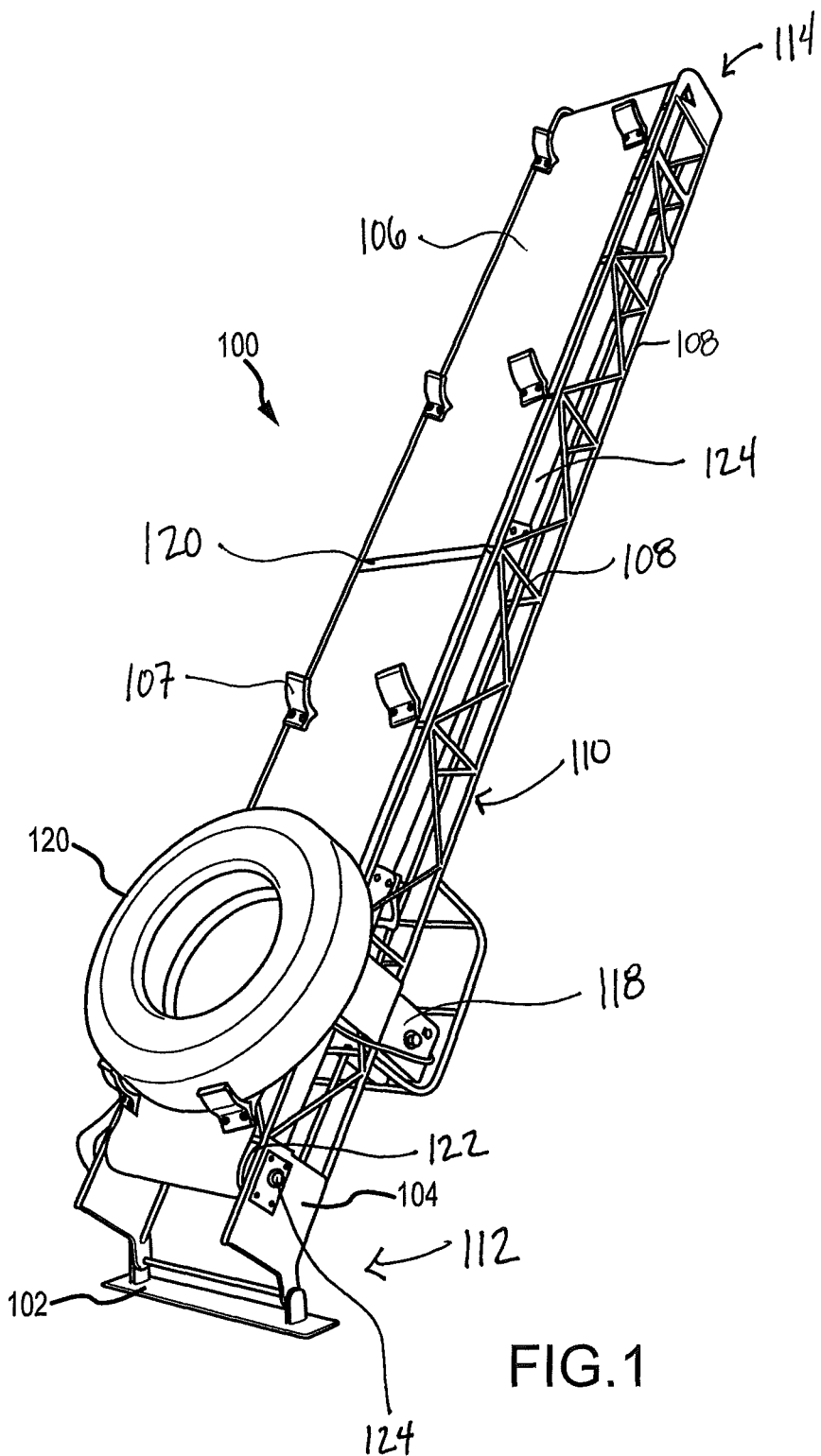
FIG. 1 is a perspective view of an embodiment of a tire conveyor.

Referring now to FIG. 1, an embodiment of the conveyor 100 of the present invention is shown. The embodiment of the conveyor 100 shown in FIG. 1 may convey tires 120 and comprise a belt 106, rounded cleats 107, an electrical box 118, and a support frame 110. The support frame 110 may comprise a support stand 102, side panels 104, support bars 108, a drive pulley 122 interconnected to the support frame 110 at a point with a pin or other connecting mechanism 124, a tail pulley, and a side plate 124. The conveyor 100 has a lower end 112, and an upper end 114. The support stand 102 and side panels 104 may be any metal material. In other embodiments, the support stand 102 and side panels 104 may be composites or durable plastics. The tires 120 may be any tire of any shape or size. The belt 106 may have one or more seams 120.

In some embodiments, the support stand 102 may be replaceable and may be replaced with various support stands or wheels to move the conveyor from location to location. The support stand 102 may also be secured to the ground or to a floor surface to prevent movement of the conveyor 100.

Figure 2:
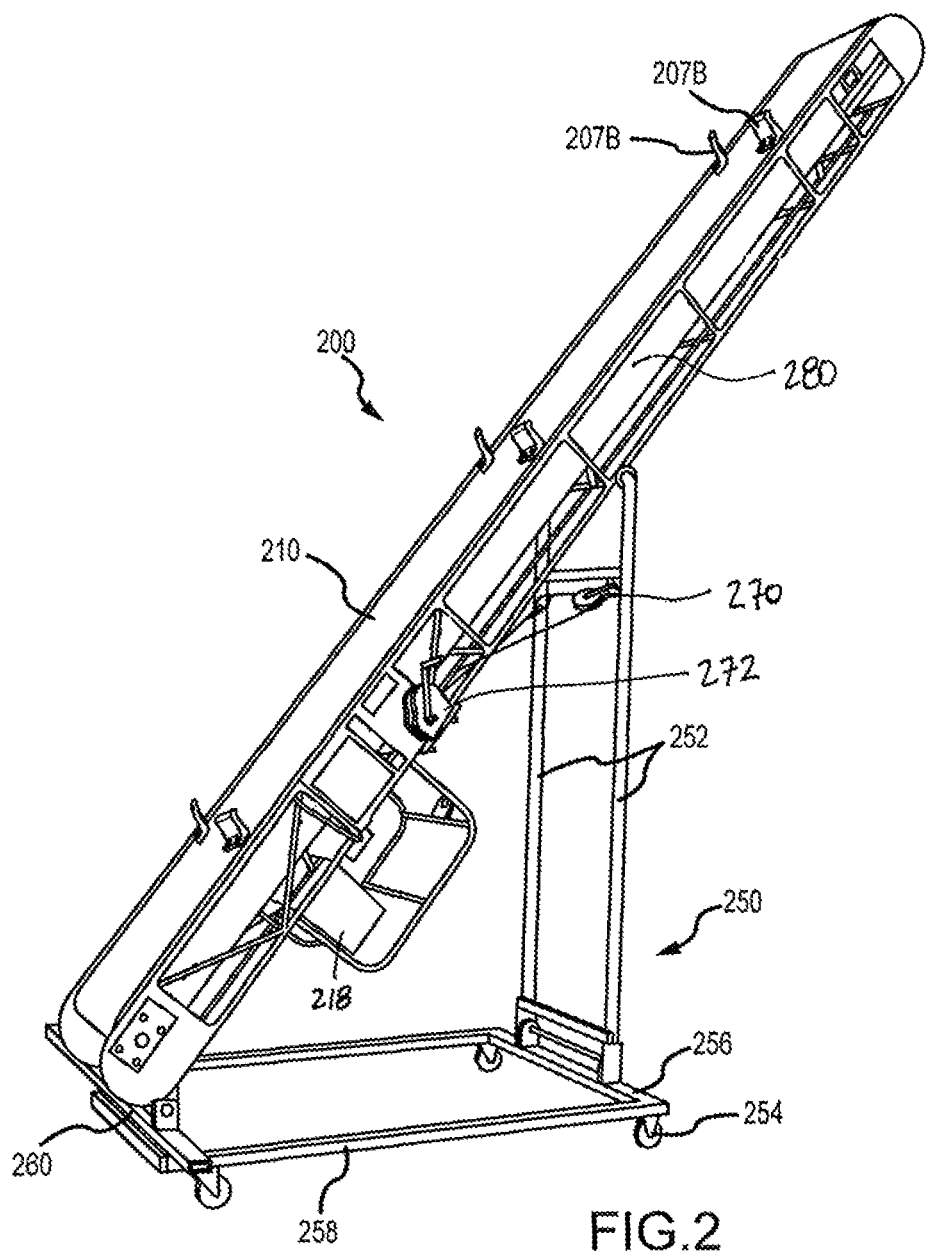
FIG. 2 is a perspective view of an embodiment of a moveable elevating belt conveyor.

FIG. 2 shows an embodiment of an elevating belt conveyor 200. The conveyor 200 may comprise cleats 207A, 207B, a belt 210, and a stand 250 with wheels 254. The stand 250 may comprise rear tall support bars 252, a rear horizontal support bar 256, side horizontal support bars 258, a front horizontal support bar 260, and wheels 254. In various embodiments, the stand 250 may be configured in ways other than that shown in FIG. 2. One skilled in the art will contemplate other configurations known now or in the future.

In various embodiments, the stand 250 may have wheels 254. In other embodiments, the stand may not have wheels 254. Further, the stand 250 may be removable and the conveyor may be secured to the ground or floor to prevent movement. In some embodiments, the wheels are detachable to prevent movement of the conveyor. Alternatively or additionally, the wheels may be lockable to prevent movement of the conveyor.

The conveyor 200 may also comprise a pulley 270, a crankshaft 272 or other means for tightening the pulley 270 and/or the belt 210. In some embodiments the underside 280 of the belt may be visible. The side of the conveyor 200 may have a side support or shield. The pulley 270 may be a plain idler pulley with a belt tensioner 272. The lower pulley 122 may also be a drive pulley for a rubber lagged conveyor belt. The electrical system may comprise an electrical box 218 with a motor. The motor may have a thermal overload motor protector to protect the motor from overheating.

Figure 3:
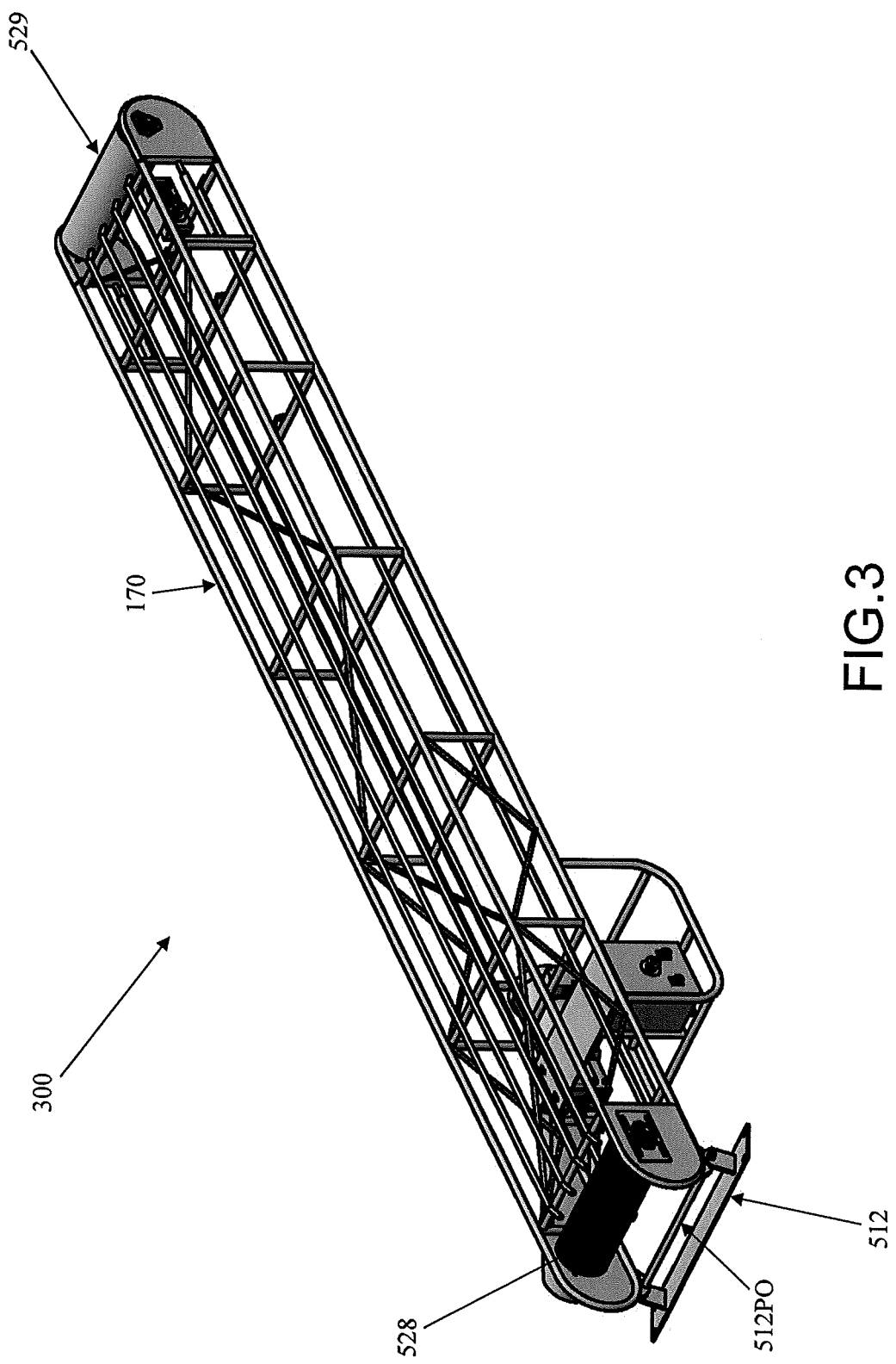
FIG. 3 is a perspective view of an embodiment of a conveyor.
Figure 4:
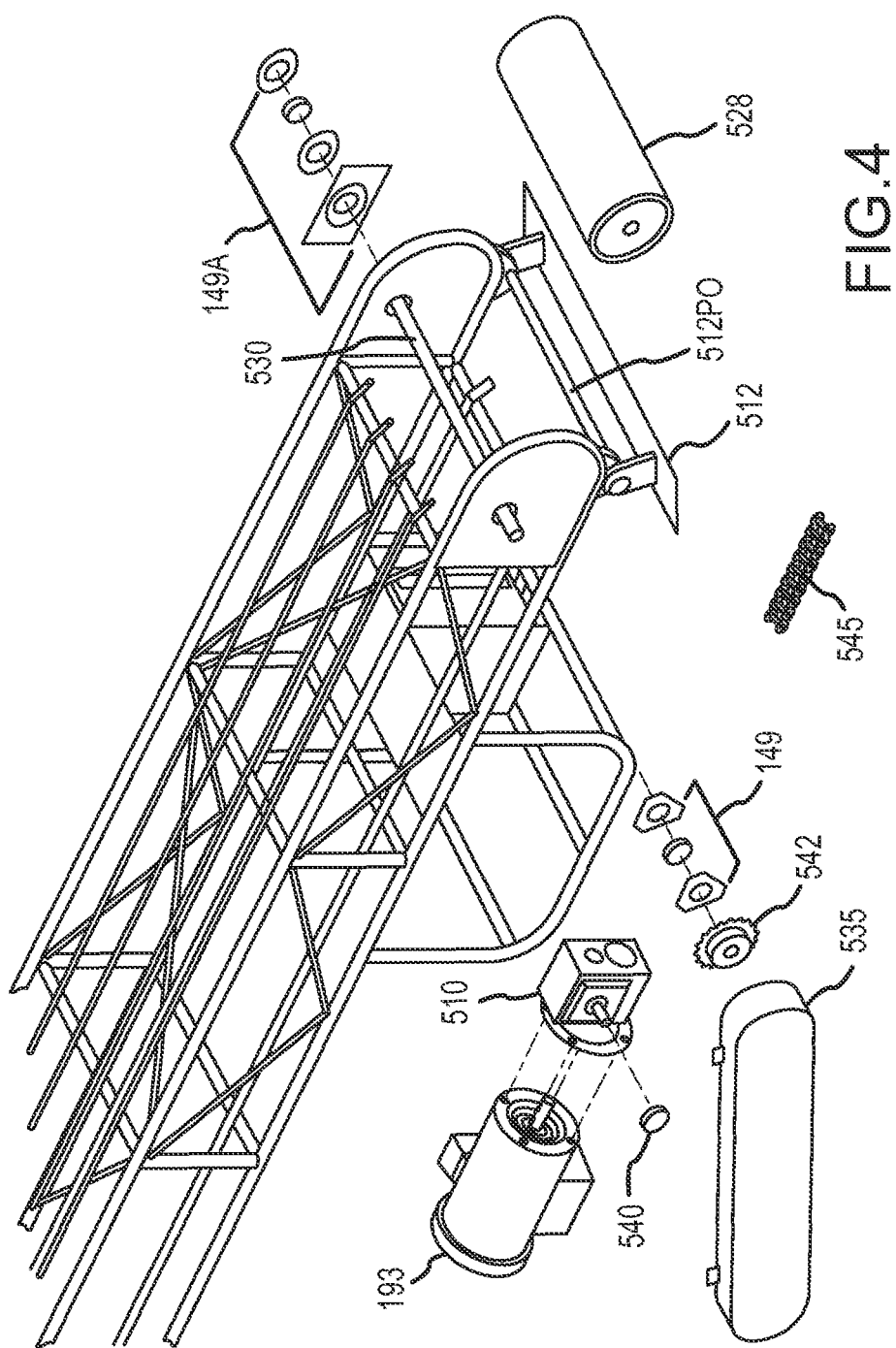
FIG. 4 is an exploded view of the lower end of the conveyor shown in FIG. 3.
Figure 5:
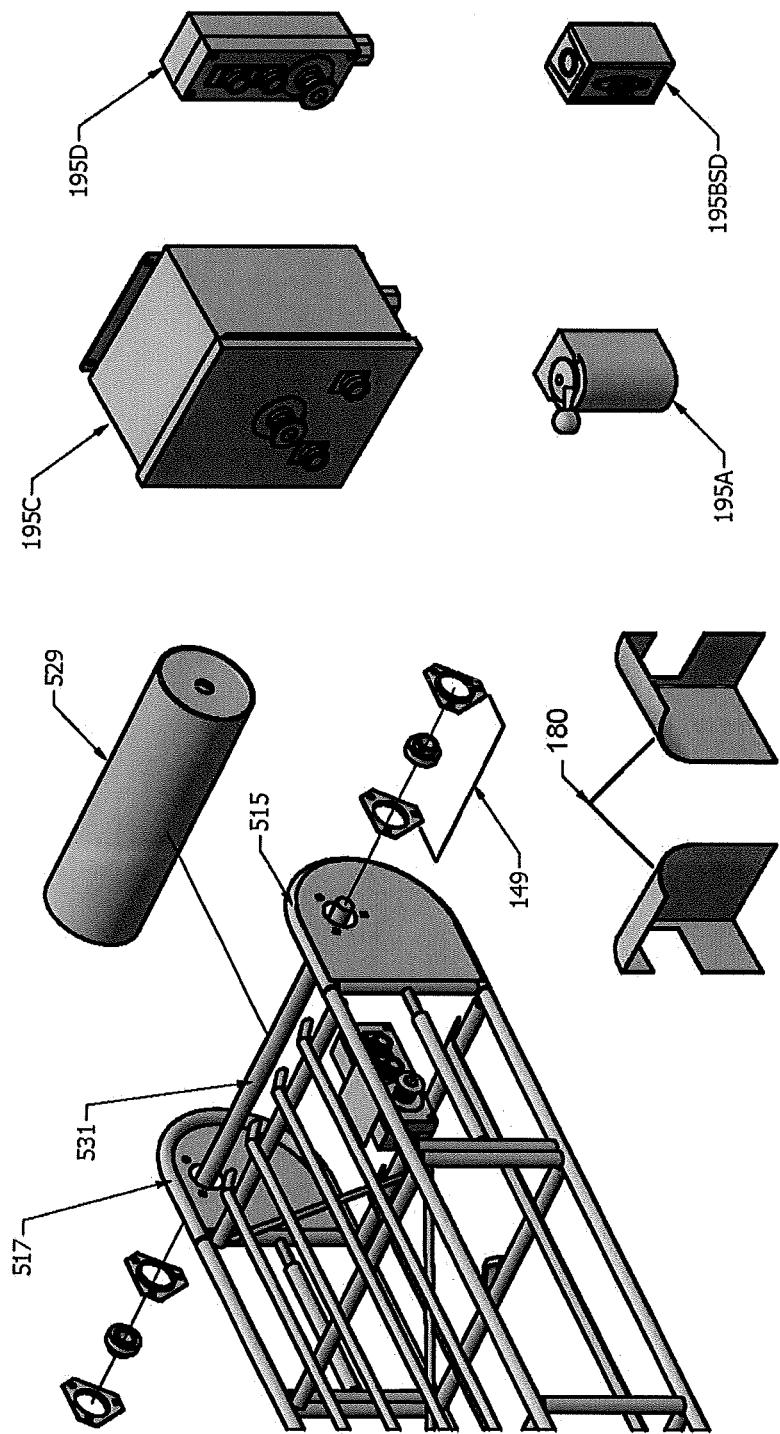
FIG. 5 is an exploded view of the upper end of the embodiment of the conveyor shown in FIG. 3.

Referring now to FIGS. 3-7, different components of an embodiment of a conveyor are shown. FIG. 3 is a perspective view of an embodiment of a conveyor 300. FIG. 4 is an exploded view of the lower end of the embodiment of the conveyor shown in FIG. 3. FIG. 5 is an exploded view of the upper end of the embodiment of the conveyor shown in FIG.

3. FIG. 6 is an exploded view of the embodiment of the conveyor shown in FIG. 3. FIG. 7 is a perspective view of a section of a belt with cleats.

FIG. 3 shows a conveyor 300 with the conveyor belt removed to show other components. In some embodiments the conveyor belt is also included. The conveyor 300 may comprise side bars 170, a tail pulley 529, a drive pulley 528, a base plate 512 with a pin, and pin only hardware 512PO.

The lower end of the conveyor 300 is shown in FIG. 4. The lower end of the conveyor 300 may comprise a bearing with 3-hole triangular flangettes 149A, a motor 193, a speed reducer 510, a base plate 512, a drive pulley 528, a drive shaft 530, a chain guard 535, a 12 tooth sprocket 540, a 30 tooth sprocket 542, and a section of roller chain 545.

The bearing with 3-hole triangular flangettes 149A may comprise a 1" bearing. In one embodiment, the motor 193 may be a 1 hp 115V 56C TEFC motor. In one embodiment, speed reducer 510 may include a ⅞" O.D. shaft. In one embodiment, base plate 512 may include a pin and pin only hardware 512PO. In an embodiment, the drive pulley 528 may include a 1" bore. In an embodiment, the drive shaft 530 may include a 1" O.D. In one embodiment, the 12 tooth sprocket 540 may include a ⅞" bore. In one embodiment, the 30 tooth sprocket 542 may include a 1" bore. In an embodiment, the section of roller chain 545 may be #40 roller chain (137 pitches+connecting link).

The upper end of the conveyor 300 is shown in FIG. 5. The upper end of the conveyor 300 may comprise a bearing with 3-hole triangular flangettes 149, a take-up frame 515 with a screw (right hand side), a take-up frame 517 with a screw (left hand side), a tail pulley 529, a tail shaft 531, a forward/reverse drum switch 195A, an ON/OFF motor rated toggle switch 195BSD, a main E-stop starter station 195C, a remote E-stop station 195D, an E-stop switch (Red), a reverse switch (black), a forward switch (green), and a set of (2) nose wings 180 with hardware.

In some embodiments, the bearing with 3-hole triangular flangettes 149 may be a 1" bearing. In an embodiment, the tail pulley 529 may comprise a 1" bore. In an embodiment, the tail shaft 531 may comprise a 1" O.D. (outside diameter).

The conveyor 300 is shown in FIG. 6. FIG. 7 shows a piece of the belt 505 with cleats 507A, 507B. In an embodiment, the belt 505 may be 18" wide 1/32" thick. Further, there may be a set of two bolts on each cleat. In embodiments, the cleats may be a set of two cleats where one cleat 507A is the right hand side cleat with hardware and the other cleat 507B is the left hand side cleat with hardware. Further, the belt 505 may comprise a set of #20×18" long hammer-on lacing 524 or a set of #RS 125×18" long staple lacing 526.

Figure 8:
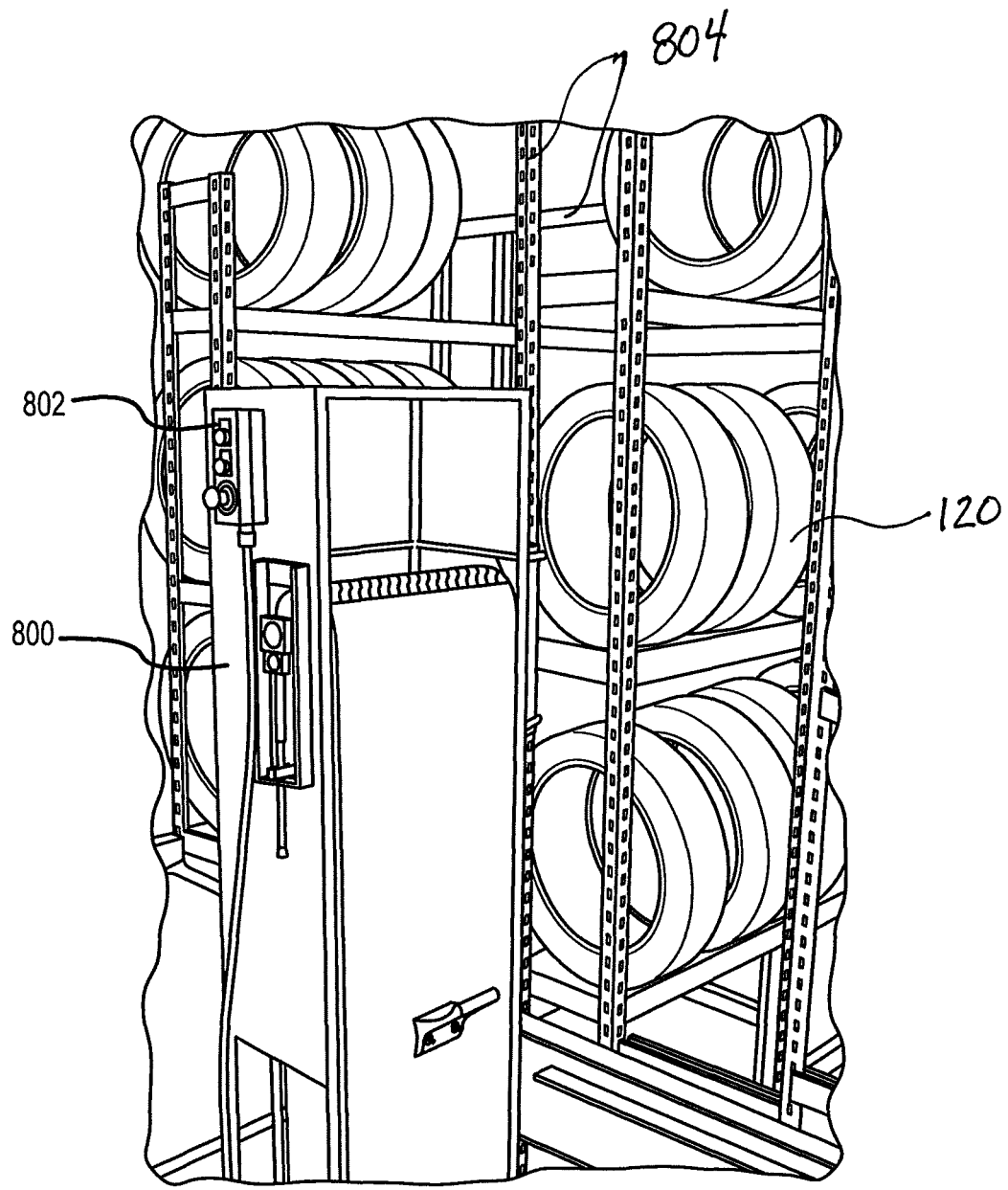
FIG. 8 is a perspective view of a vertical conveyor.

FIG. 8 shows a perspective view of a vertical conveyor 800. The conveyor 800 may include a control switch 802 to turn the conveyor 800 on and off. One embodiment of a tire rack 804 for holding tires 120 is also shown in FIG. 8. The vertical conveyor 800 conveys tires 120 upward to high levels or high shelves of the rack 804 and conveys tires 120 downward from high levels or shelves of the rack 804 to the ground for use or transport.

Figure 9:
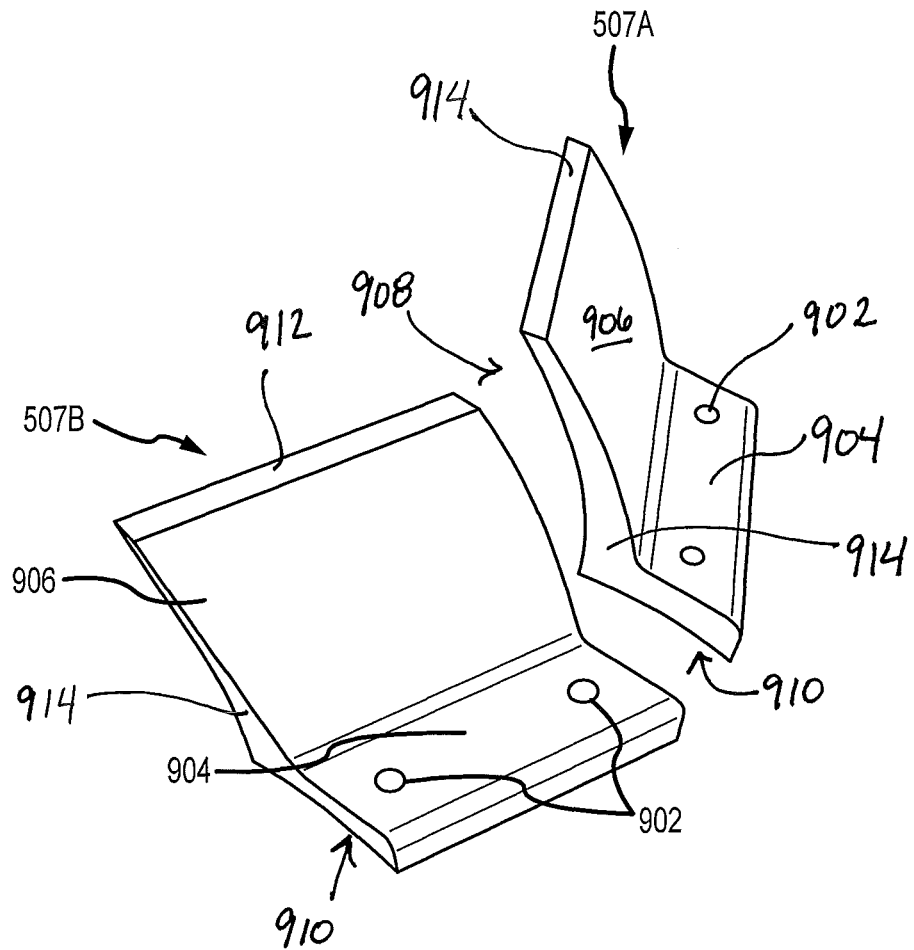
FIG. 9 is a perspective view of two curved cleats.

FIG. 9 shows a perspective view of two curved cleats 507A, 507B. In some embodiments, the cleats are 4" cleats 507A, 507B. In an embodiment, the cleats 507A, 507B may include a set of two bolts. Further, the bolts may be ¼"×1¼" #1 elevator bolts with hardware. The cleats 507A, 507B may also include holes 902 for the bolts or other attachment/connection mechanisms. The cleats 507A, 507B may have a flat lower area 904 (also called a "block" herein) and a curved section 906. The curved section 906 has a back side (i.e., side show and side facing away from the tire or article) and an article-supporting face 908 (not shown, and is positioned opposite the back side 906). The cleats 507A, 507B also have a top 912, a bottom 910, and sides 914.

Figure 10:
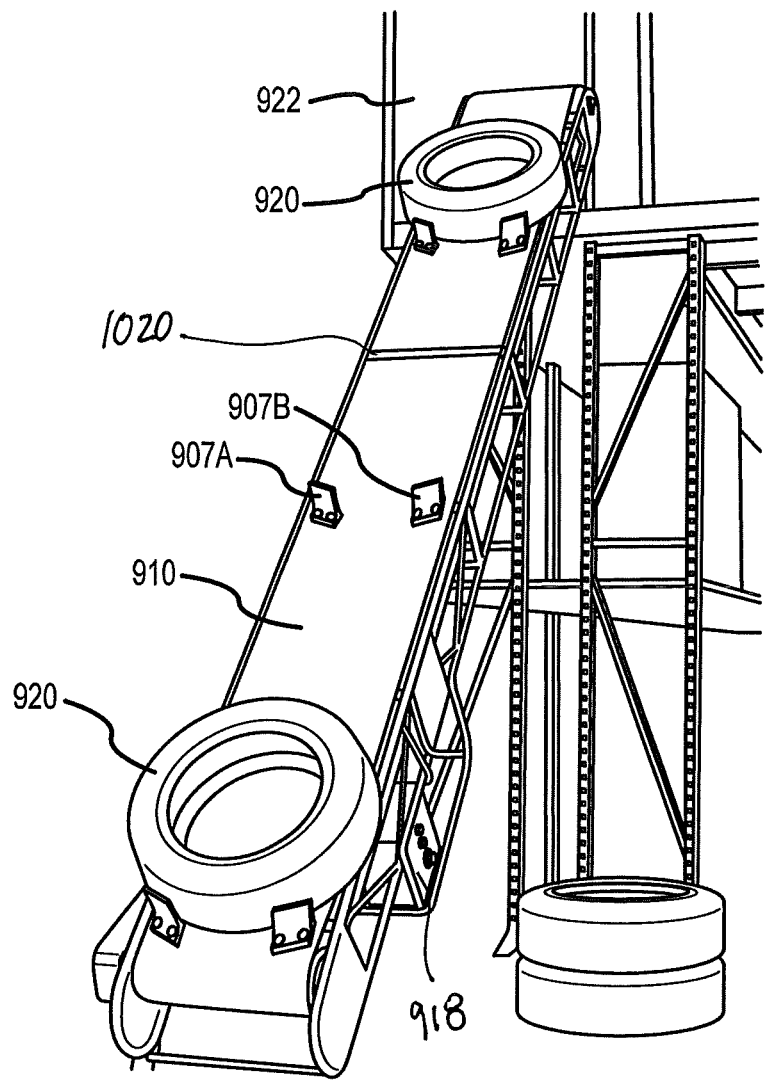
FIG. 10 is a perspective view of an embodiment of an elevating belt conveyor conveying tires.

FIG. 10 is a perspective view of an embodiment of an elevating belt conveyor conveying tires 920 to an upper floor 922. The conveyor may comprise a belt 910 and cleats 907A, 907B. The belt 910 may have a seam 1020 and an upper surface and a lower surface. The conveyor may also have an electrical box 918 with power buttons, and an emergency stop button, etc.

Figure 11:
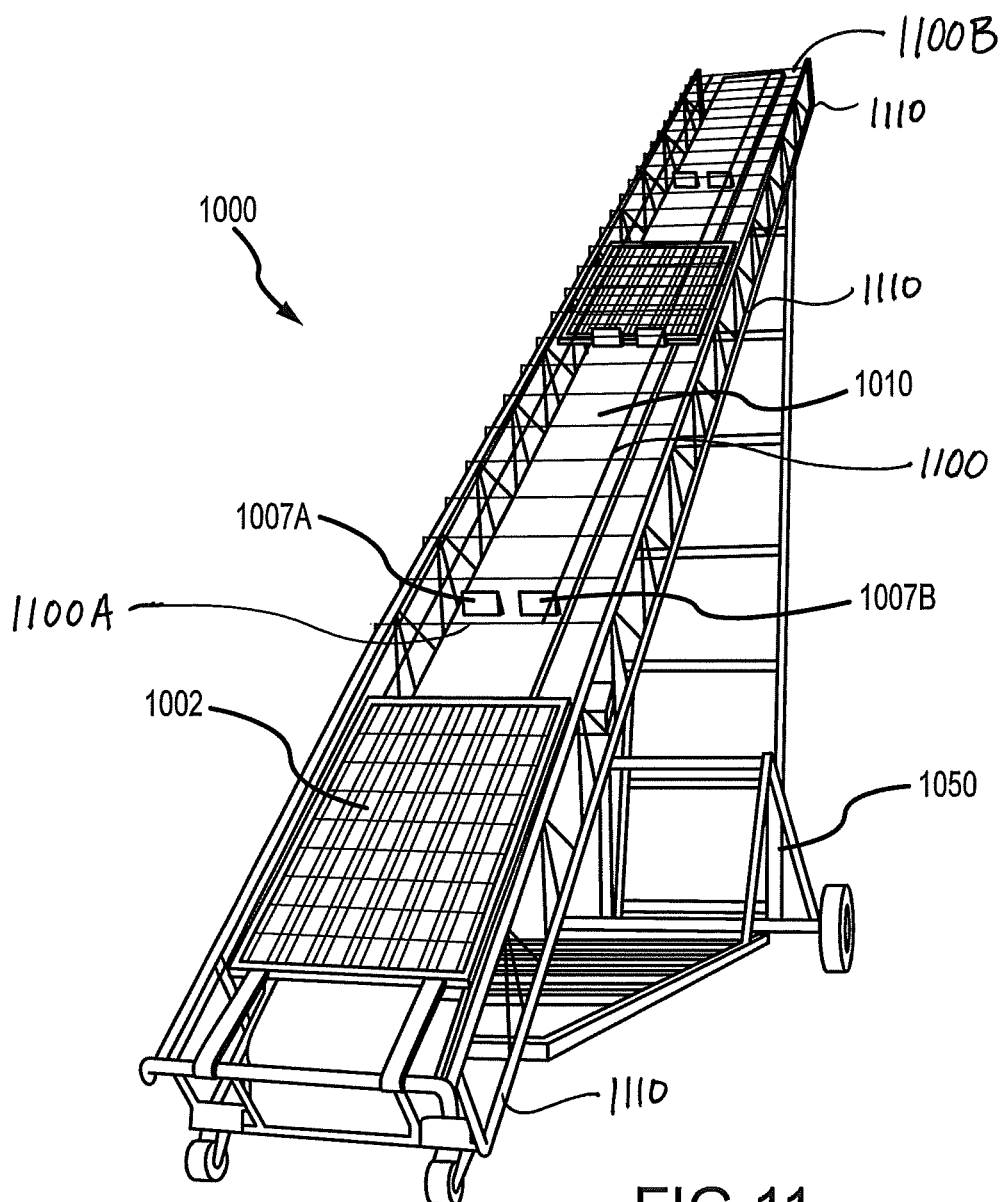
FIG. 11 is a perspective view of an embodiment of an elevating belt conveyor conveying panels.

FIG. 11 shows an embodiment of an elevating conveyor 1000 conveying solar panels 1002. The conveyor may comprise a conveyor belt 1010, a support frame 1110, cleats 1007A, 1007B, a stand 1050, and a retention mechanism 1100. The retention mechanism 1100 has a lower end 1100A and an upper end 1100B. The retention mechanism 1100 is interconnected to the support frame 1110 and does not run the entire length of the support frame 1110 such that articles may be loaded onto the conveyor belt 1010 at the bottom of the elevating conveyor 1000 and removed at the top of the elevating belt conveyor 1000. In one embodiment, the retention mechanism 1100 is a set of bars made of the same material or a similar material to the support frame 1110. Articles, such as solar panels 1002, do not touch the retention mechanism 1100 unless the article falls away from the conveyor belt 1010. At that point, the retention mechanism 1100 keeps the article from completely falling off of the conveyor 1000. In some additional embodiments, the retention mechanism may also prevent the articles from moving from side to side on the conveyor 1000 or from falling off of the side of the conveyor 1000.

Figure 12:
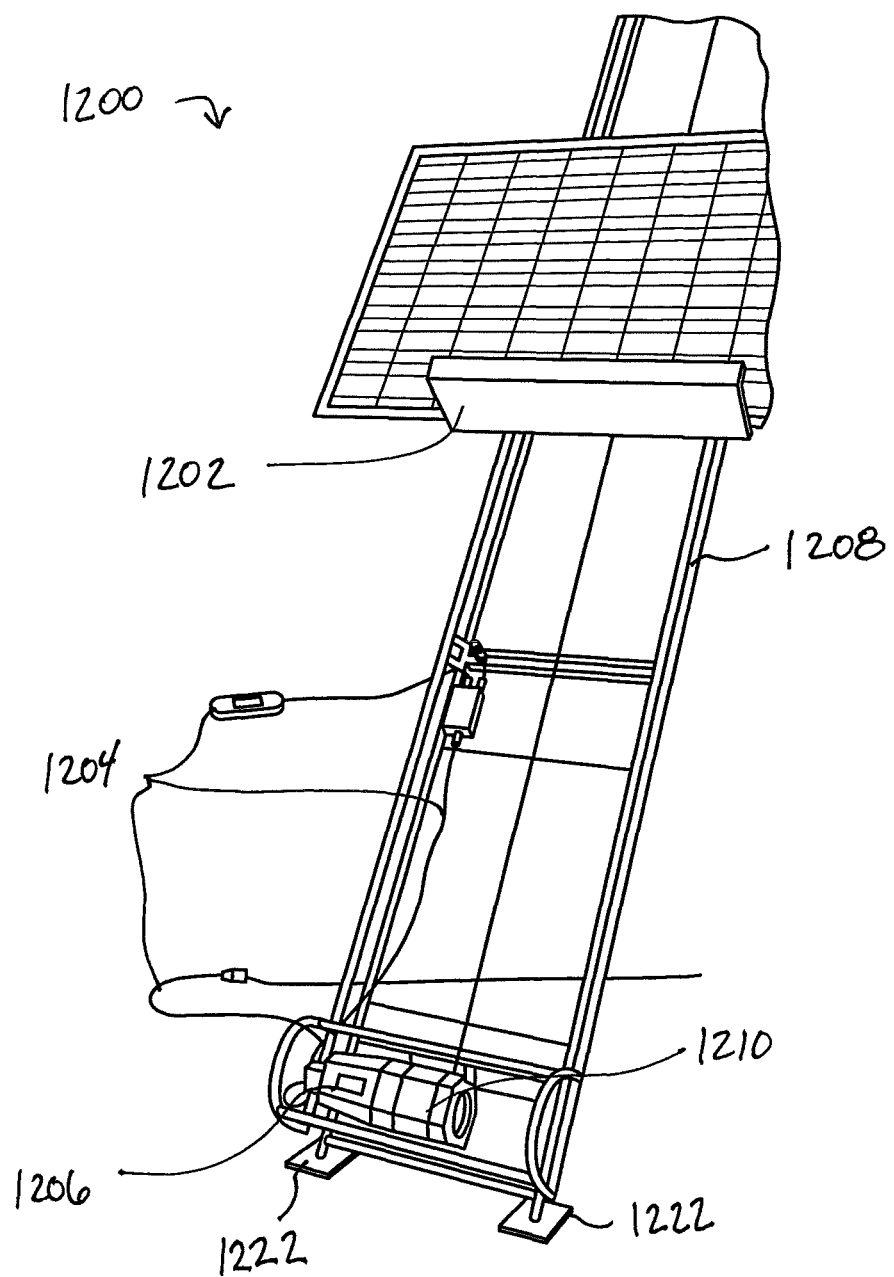
FIG. 12 is a perspective view of an embodiment of an elevating conveyor.

FIG. 12 shows an embodiment of an elevating conveyor 1200 used in industrial uses. The elevating conveyor 1200 may comprise a support frame 1208, motor 1206, pulley 1210, electrical system 1204, drive pulley 1210, and one or more cleats 1202. In some embodiments, the support frame 1208 may comprise support feet 1222 (alternative to a single support stand as shown in FIG. 1 as element 102). Either a support stand or support feet (even more than two feet) maybe be used in the various embodiments described herein.

Figure 13:
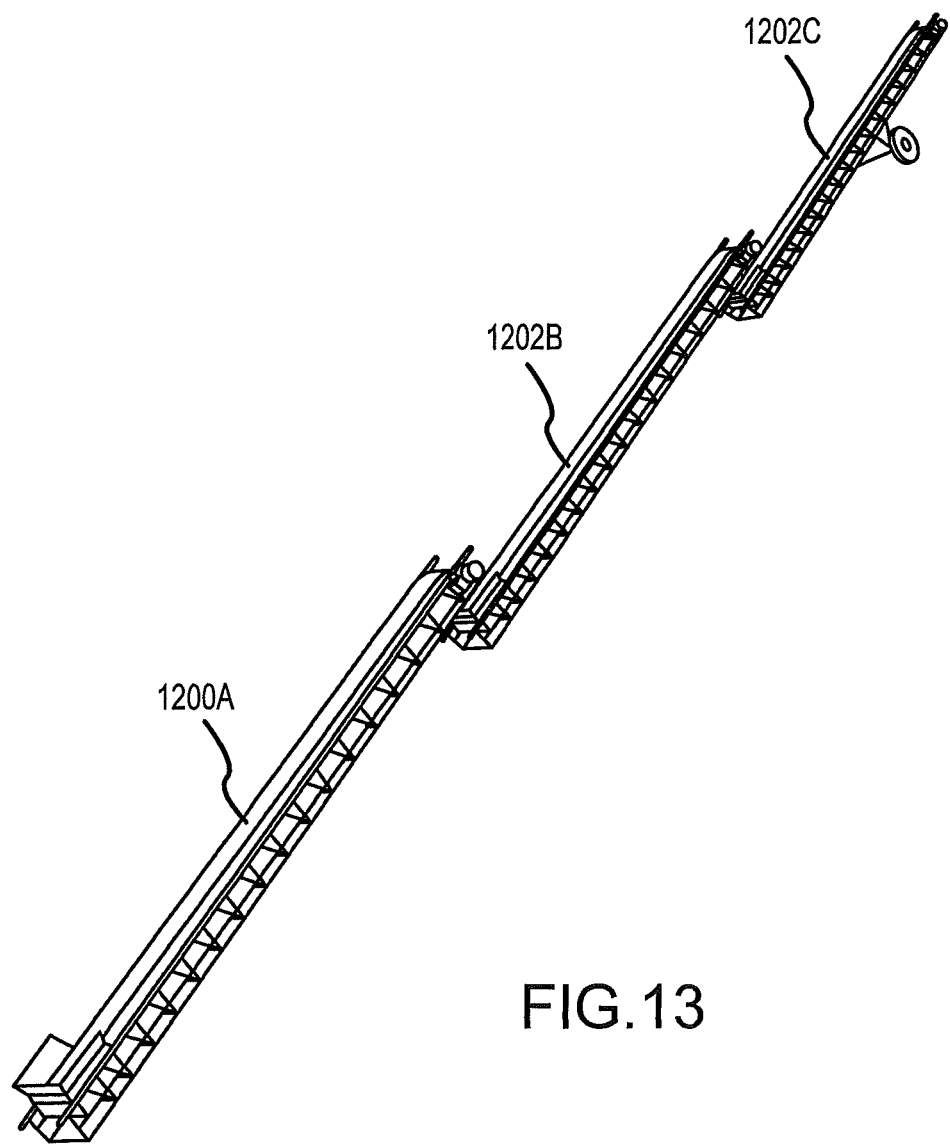
FIG. 13 is a perspective view of an embodiment of a system of multiple elevating conveyors.

FIG. 13 shows an embodiment of a system of multiple elevating conveyors 1200A, 1200B, 1200C.

Figure 14C:
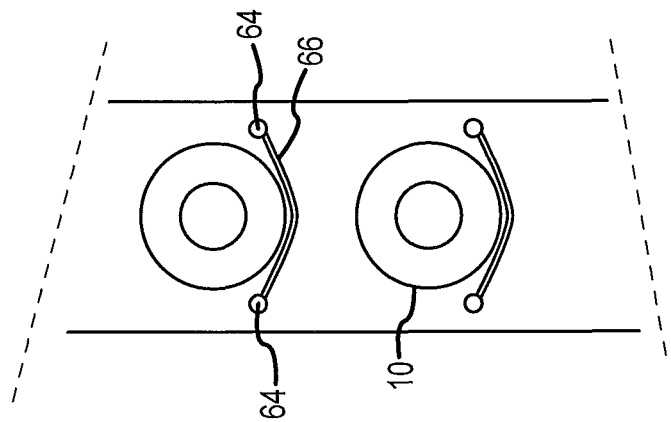
FIG. 14C is a top elevation view of a third embodiment of cleats on a conveyor.
Figure 14B:
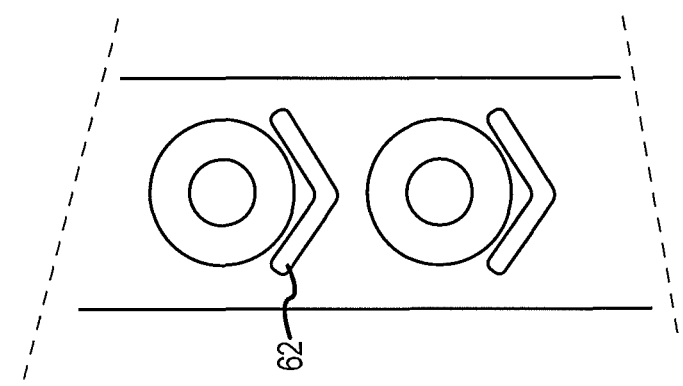
FIG. 14B is a top elevation view of a second embodiment of cleats on a conveyor.
Figure 14A:
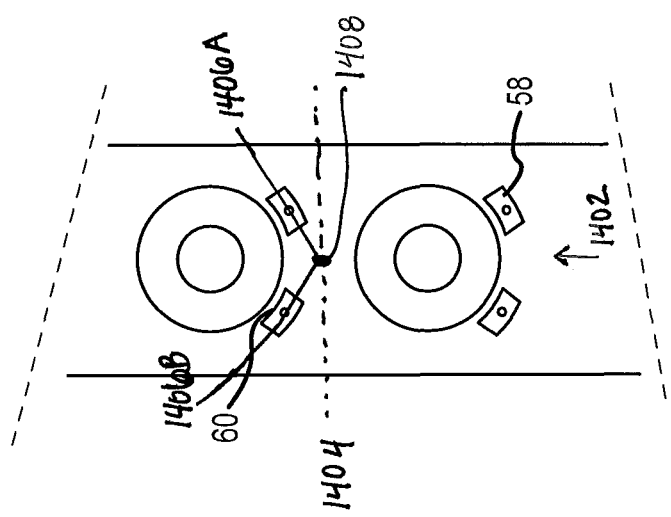
FIG. 14A is a top elevation view of an embodiment of cleats on a conveyor.

Other embodiments of cleats or support elements are shown in FIGS. 14A-14C. Note that the term "cleat" and the term "support element" may be used interchangeably herein. FIG. 14A shows an embodiment of cleats holding a tire on a conveyor. The cleats in FIG. 14A are posts 58 that have article-supporting faces 60 contoured to complement the shape of and to mate with a conveyed article. The posts or cleats 58 also have article-supporting faces 60 that define a plane 1406A, 1406B oblique to the direction of belt travel 1402 and intersecting at a point 1408 below the posts or cleats 58 on the belt. The angle defined by the cleats or posts 58 may also be measured from the horizontal line 1404. The cleats in FIG. 14B are chevron-shaped flights 62 serving as pockets for conveyed articles. Each flight may be a single piece or segmented. In FIG. 14C, each cleat constitutes a pair of pins 64 between which an elastomeric band 66 is strung. The weight of the conveyed article pushing on the elastomeric band stretches the band to conform to the outer surface of the conveyed article 10. These are just a few additional examples of cleats that are usable in the conveyors of FIGS. 1-13. Other support elements, such as buckets, transverse flights, or arrays of pins, could alternatively be used.

While various embodiment of the present invention have been described in detail, it is apparent that modifications and alterations of those embodiments will occur to those skilled in the art. However, it is to be expressly understood that such modifications and alterations are within the scope and spirit of the present disclosure, as set forth in the following claims.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the present disclosure has included descriptions of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter. Further, the invention(s) described herein is capable of other embodiments and of being practiced or of being carried out in various ways. It is to be understood that the phraseology and terminology used herein is for the purpose of description and should not be regarded as limiting.

We claim:

1. A conveyor for conveying articles up inclines, the conveyor comprising:
    an endless conveyor belt having an outer article-conveying surface and advancing in a direction of belt travel along a conveying path including an inclined portion;
    a plurality of support elements extending outwardly from the outer article-conveying surface of the conveyor belt and spaced apart at an increment approximately equal to about 1.5 times a length of the article conveyed, wherein the plurality of support elements comprises pairs of two support elements and each support element in the pair is positioned proximate to the other support element in the pair and with a space between the two support elements, wherein each support element comprises:
    curved section having an article-supporting face, which is curved at a first radius of curvature and is positioned in the direction of belt travel, and a back side opposite the article-supporting face, said back side is curved with a second radius of curvature, wherein the first radius of curvature is smaller than the second radius of curvature;
    a block-like bottom section with a flat bottom that engages the outer article-conveying surface of the conveyor belt; and
    a top opposite the bottom, wherein the top is positioned at an angle relative to the flat bottom;
    two securing mechanisms for each support element to secure the support elements on the conveyor belt;
    a support frame with a support stand positioned proximate to a floor surface and support bars;
    a drive pulley interconnected to the support frame and positioned at the bottom of the support frame, wherein an underside of the conveyor belt engages an outer surface of the drive pulley;
    a tail pulley interconnected to the support frame and positioned at the top of the support frame, wherein an underside of the conveyor belt engages an outer surface of the tail pulley; and
    a motor for moving the conveyor belt around the drive pulley and tail pulley.

2. A conveyor as in claim 1, wherein a first support element in one pair of support elements has an article-supporting face defining a first plane oblique to the direction of belt travel and a second support element in the pair of support elements has an article-supporting face defining a second plane oblique to the direction of belt travel, wherein the first plane and the second plane intersect at a point on the conveyor belt below the first support element and the second support element.

3. A conveyor as in claim 1, wherein the support elements are contoured in shape to mate with a conveyed article.

4. A conveyor as in claim 1, wherein the support elements are made of an elastomeric material that conforms to the shape of a conveyed article on the inclined portion of the conveying path.

5. A conveyor as in claim 1 further comprising a retention mechanism for preventing the conveyed articles from falling off of the conveyor belt, said retention mechanism positioned along the inclined portion of the conveying path.

6. A conveyor as in claim 1 further comprising:
    an article-restraining surface positioned above and facing the article-conveying surface of the conveyor belt, wherein the article-restraining surface is spaced away from the support elements, and wherein the article-restraining surface engages outwardly leaning conveyed articles moving upward on the inclined portion of the conveying path in low-friction contact.

7. A conveyor as in claim 1 wherein the inclined portion of the conveying path is approximately 60 degrees as measured from a horizontal plane.

8. A tire conveyor for conveying tires up an incline, comprising:
    an endless conveyor belt having a lateral extent and a longitudinal extent, and an outer tire-conveying surface that is designed to advance in a direction of belt travel along a conveying path including an inclined portion;
    a first pair of first and second tire support elements, with each of said first and second tire support elements having a same width (w), length (l) and height (h), with said first tire support element spaced a distance along said lateral extent of said conveyor belt from said second tire support element by at least twice the width, wherein said pair of first and second tire support elements are each interconnected to said outer tire-conveying surface by two independent fasteners that penetrate through said outer tire-conveying surface, said first tire support element being fastened to said outer tire-conveying surface at a first angle with respect to said lateral extent of said conveyor belt, and said second tire support element being fastened to said outer tire-conveying surface at a second angle with respect to said lateral extent of said conveyor belt, said first angle and said second angle being commensurate and opposite each other, wherein when a tire is placed in contact with said first and second tire support elements, the first tire support element is between a 4 o'clock and 5 o'clock position of the tire and the second tire support element is between a 7 o'clock and 8 o'clock position of the tire, wherein each of said first and second tire support elements has a front section having an tire-supporting face that has a first curve that is curved along its length and toward the direction of belt travel and a back section that has a second curve that is curved along its length and in the direction of belt travel, said second curve being greater than said first curve, each of said pair of tire engaging support elements having a flat conveyor contacting surface that engages the outer tire-conveying surface of the conveyor belt, each of said tire support elements constructed entirely from an elastomeric material that provides flexibility along said length of said tire support elements such that when a tire is positioned on said conveyor belt, said first and second tire support elements bend in a direction opposite the direction of belt travel along a conveying path;

a second pair of first and second tire support elements spaced apart from said first pair of tire support elements by at least a distance of 1.5 times a length of a tire conveyed on said conveyor belt;

a support frame with a support stand, said support frame having two, longitudinally extending side bar supports extending parallel to each other and connected to each other by a plurality of support struts;

a drive pulley operably connected to said support frame that engages said conveyor belt;

a tail pulley operably connected to said support frame that engages said conveyor belt; and a motor operably connected to said drive pulley.

9. A tire conveyor as claimed in claim 8, further comprising a tire-restraining mechanism interconnected to the support frame and positioned above and facing the tire-conveying surface of the conveyor belt, wherein the tire-restraining mechanism comprises at least one bar arranged in the direction of belt travel and at least two bars positioned perpendicular to the direction of belt travel, wherein the tire-restraining surface is spaced away from the support elements, and wherein the tire-restraining surface engages outwardly leaning conveyed tires moving upward on the inclined portion of the conveying path.

10. A tire conveyor as claimed in claim 9 comprising an array of rollers having outer surfaces forming the tire-restraining surface facing the tire-conveying surface, wherein the rollers are arranged to rotate in the direction of belt travel on contact with outwardly leaning conveyed tires.

11. A tire conveyor of claim 8, further comprising a tire sorting apparatus comprising:
a mount, wherein the mount positions a tire in a plane perpendicular to the center axis of the tire;
a tire grip, wherein the tire grip grips the inner periphery of the tire and positions the center axis of the tire;
an ID reader, wherein the ID reader reads a tire identification marking formed on the surface of the tire; and
a holder, wherein the holder holds the ID reader, wherein the tire grip further includes three grip arms arranged at the vertexes of a triangle within a plane perpendicular to the center axis of the tire, wherein the holder further includes a holding unit for holding the ID reader, and a rotation drive unit for rotating the holder around a rotation axis parallel to the center axis of the tire, and wherein the center of the circumscribing circle is aligned with the rotation axis of the holding unit.

12. The tire conveyer of claim 11, further comprising an apparatus for loading the tire onto a rack, the apparatus comprising:
a first scanner configured to provide information regarding said tire;
a tire conveyor configured to transport said tire;
a robot configured to automatically move the tire from the tire conveyor onto the rack; and
a computer configured to control the robot using the information from the first scanner.

13. A method for conveying articles up steep inclines, the method comprising:
providing a conveyor for conveying articles up an incline, said conveyor comprising:
an endless conveyor belt having a lateral extent and a longitudinal extent, and an outer article-conveying surface that is designed to advance in a direction of belt travel along a conveying path including an inclined portion;
a plurality of support elements, with each support element having a same width (w), length (l), and height (h), wherein each support element of said plurality of support elements is interconnected to said outer conveying surface by two independent fasteners that penetrate through said outer article-conveying surface, wherein each of said support elements has a front section having an article-supporting face that is oriented in the direction of belt travel, each of said support elements having a flat conveyor contacting surface that engages the outer article-conveying surface of the conveyor belt, each of said support elements constructed of urethane material that provides strength along the supporting elements, wherein a second support element in the plurality of support elements is spaced apart from a first support element in the plurality of support elements by at least a distance of 1.5 times a length of an article conveyed on said conveyor belt;
a support frame with a support stand, said support frame having two, longitudinally extending side bar supports extending parallel to each other and connected to each other by a plurality of support struts;
a drive pulley operably connected to said support frame that engages said conveyor belt;
a tail pulley operably connected to said support frame that engages said conveyor belt; and
a motor operably connected to said drive pulley;
moving said endless conveyor belt in the direction of belt travel using the motor, the drive pulley, and the tail pulley;
conveying articles on the outer article-conveying surface of the conveyor belt;
advancing the conveyed articles in the direction of belt travel along a conveying path including the inclined portion;
blocking conveyed articles from sliding down the conveying surface of the conveyor belt on the inclined portion by using said plurality of support elements; and
removing the conveyed articles from the conveyor belt.

14. The method for conveying articles up steep inclines of claim 13, further comprising:
sorting the conveyed articles using a sorting apparatus; and
depending on the sorting step, loading a first type of conveyed article onto the conveyor belt.

15. The method of claim 14, further comprising a method of unloading conveyed articles from a rack, the method comprising:
moving the conveyed articles from the rack to the sorting apparatus;
reading identification information on the conveyed articles using a computer-controlled vision system;

removing the conveyed articles from the conveyor belt using a robot, wherein the identification information facilitates control of the second robot; and placing the conveyed articles in one of a loader and a storage structure.

\* \* \* \* \*